US008223382B2

(12) United States Patent
Umezawa

(10) Patent No.: US 8,223,382 B2
(45) Date of Patent: Jul. 17, 2012

(54) PRINTING APPARATUS AND CONTROL METHOD THEREFOR

(75) Inventor: Masahiko Umezawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1073 days.

(21) Appl. No.: 12/135,560

(22) Filed: Jun. 9, 2008

(65) Prior Publication Data

US 2009/0002728 A1 Jan. 1, 2009

(30) Foreign Application Priority Data

Jun. 29, 2007 (JP) ................................ 2007-173113

(51) Int. Cl.
*G06F 15/00* (2006.01)
*G03B 27/00* (2006.01)

(52) U.S. Cl. ........................................ 358/1.16; 355/18

(58) Field of Classification Search ................. 358/1.16, 358/1.15
See application file for complete search history.

(56) References Cited

U.S. PATENT DOCUMENTS

2002/0186386 A1* 12/2002 Kawanabe et al. ............ 358/1.8
2006/0290720 A1 12/2006 Katsu

FOREIGN PATENT DOCUMENTS

CN 1891464 A 1/2007
EP 1741560 A2 1/2007
JP 2004-9489 A 1/2004

* cited by examiner

*Primary Examiner* — Saeid Ebrahimi Dehkordy
(74) *Attorney, Agent, or Firm* — Fitzpatrick, Cella, Harper & Scinto

(57) ABSTRACT

An object of this invention is to provide a printing apparatus capable of reducing slanting displacement for high-quality image. To achieve this object, slant information of a printing element array (141, 142, 143, 144) in a printhead scanning direction is obtained. Image data used to print by one scanning of the printhead (11) is stored in a printing buffer (204). Image data of three columns used by the printing element array are stored in a transfer buffer (213). Image data of two successive columns out of the image data of three columns are read out from the transfer buffer (213), and image data of a column is selected based on the slant information. Image data of one column is newly read out from the printing buffer (204), and the data area of the transfer buffer corresponding to one column is rewritten. The selected image data is transferred to the printhead (11) for printing.

7 Claims, 35 Drawing Sheets

FIG. 1

A

| | NZL | SBK | DATA 1st col. | DATA 2nd col. | DATA 3rd col. | DATA 4th col. |
|---|---|---|---|---|---|---|
| G0 | 0 | 0 | ○ | ○ | ○ | × |
| | 1 | 1 | ○ | ○ | ○ | × |
| | 2 | 2 | ○ | ○ | ○ | × |
| | 3 | 3 | ○ | ○ | ○ | × |
| | 4 | 4 | ○ | ○ | ○ | × |
| | 5 | 5 | ○ | ○ | ○ | × |
| | 6 | 6 | ○ | ○ | ○ | × |
| | 7 | 7 | ○ | ○ | ○ | × |
| | 8 | 8 | ○ | ○ | ○ | × |
| | 9 | 9 | ○ | ○ | ○ | × |
| | 10 | 10 | ○ | ○ | ○ | × |
| | 11 | 11 | ○ | ○ | ○ | × |
| | 12 | 12 | ○ | ○ | ○ | × |
| | 13 | 13 | ○ | ○ | ○ | × |
| | 14 | 14 | ○ | ○ | ○ | × |
| | 15 | 15 | ○ | ○ | ○ | × |
| G1 | 16 | 0 | × | ○ | ○ | ○ |
| | 17 | 1 | × | ○ | ○ | ○ |
| | 18 | 2 | ○ | ○ | ○ | × |
| | 19 | 3 | ○ | ○ | ○ | × |
| | 20 | 4 | ○ | ○ | ○ | × |
| | 21 | 5 | ○ | ○ | ○ | × |
| | 22 | 6 | ○ | ○ | ○ | × |
| | 23 | 7 | ○ | ○ | ○ | × |
| | 24 | 8 | ○ | ○ | ○ | × |
| | 25 | 9 | ○ | ○ | ○ | × |
| | 26 | 10 | ○ | ○ | ○ | × |
| | 27 | 11 | ○ | ○ | ○ | × |
| | 28 | 12 | ○ | ○ | ○ | × |
| | 29 | 13 | ○ | ○ | ○ | × |
| | 30 | 14 | ○ | ○ | ○ | × |
| | 31 | 15 | ○ | ○ | ○ | × |
| G2 | 32 | 0 | × | ○ | ○ | ○ |
| | 33 | 1 | × | ○ | ○ | ○ |
| | 34 | 2 | × | ○ | ○ | ○ |
| | 35 | 3 | × | ○ | ○ | ○ |
| | 36 | 4 | ○ | ○ | ○ | × |
| | 37 | 5 | ○ | ○ | ○ | × |
| | 38 | 6 | ○ | ○ | ○ | × |
| | 39 | 7 | ○ | ○ | ○ | × |
| | 40 | 8 | ○ | ○ | ○ | × |
| | 41 | 9 | ○ | ○ | ○ | × |
| | 42 | 10 | ○ | ○ | ○ | × |
| | 43 | 11 | ○ | ○ | ○ | × |
| | 44 | 12 | ○ | ○ | ○ | × |
| | 45 | 13 | ○ | ○ | ○ | × |
| | 46 | 14 | ○ | ○ | ○ | × |
| | 47 | 15 | ○ | ○ | ○ | × |
| G3 | 48 | 0 | × | ○ | ○ | ○ |
| | 49 | 1 | × | ○ | ○ | ○ |
| | 50 | 2 | × | ○ | ○ | ○ |
| | 51 | 3 | × | ○ | ○ | ○ |
| | 52 | 4 | × | ○ | ○ | ○ |
| | 53 | 5 | × | ○ | ○ | ○ |
| | 54 | 6 | ○ | ○ | ○ | × |
| | 55 | 7 | ○ | ○ | ○ | × |
| | 56 | 8 | ○ | ○ | ○ | × |
| | 57 | 9 | ○ | ○ | ○ | × |
| | 58 | 10 | ○ | ○ | ○ | × |
| | 59 | 11 | ○ | ○ | ○ | × |
| | 60 | 12 | ○ | ○ | ○ | × |
| | 61 | 13 | ○ | ○ | ○ | × |
| | 62 | 14 | ○ | ○ | ○ | × |
| | 63 | 15 | ○ | ○ | ○ | × |
| G4 | 64 | 0 | × | ○ | ○ | ○ |
| | 65 | 1 | × | ○ | ○ | ○ |
| | 66 | 2 | × | ○ | ○ | ○ |
| | 67 | 3 | × | ○ | ○ | ○ |
| | 68 | 4 | × | ○ | ○ | ○ |
| | 69 | 5 | × | ○ | ○ | ○ |
| | 70 | 6 | × | ○ | ○ | ○ |
| | 71 | 7 | × | ○ | ○ | ○ |
| | 72 | 8 | ○ | ○ | ○ | × |
| | 73 | 9 | ○ | ○ | ○ | × |
| | 74 | 10 | ○ | ○ | ○ | × |
| | 75 | 11 | ○ | ○ | ○ | × |
| | 76 | 12 | ○ | ○ | ○ | × |
| | 77 | 13 | ○ | ○ | ○ | × |
| | 78 | 14 | ○ | ○ | ○ | × |
| | 79 | 15 | ○ | ○ | ○ | × |
| G5 | 80 | 0 | × | ○ | ○ | ○ |
| | 81 | 1 | × | ○ | ○ | ○ |
| | 82 | 2 | × | ○ | ○ | ○ |
| | 83 | 3 | × | ○ | ○ | ○ |
| | 84 | 4 | × | ○ | ○ | ○ |
| | 85 | 5 | × | ○ | ○ | ○ |
| | 86 | 6 | × | ○ | ○ | ○ |
| | 87 | 7 | × | ○ | ○ | ○ |
| | 88 | 8 | × | ○ | ○ | ○ |
| | 89 | 9 | × | ○ | ○ | ○ |
| | 90 | 10 | ○ | ○ | ○ | × |
| | 91 | 11 | ○ | ○ | ○ | × |
| | 92 | 12 | ○ | ○ | ○ | × |
| | 93 | 13 | ○ | ○ | ○ | × |
| | 94 | 14 | ○ | ○ | ○ | × |
| | 95 | 15 | ○ | ○ | ○ | × |
| G6 | 96 | 0 | × | ○ | ○ | ○ |
| | 97 | 1 | × | ○ | ○ | ○ |
| | 98 | 2 | × | ○ | ○ | ○ |
| | 99 | 3 | × | ○ | ○ | ○ |
| | 100 | 4 | × | ○ | ○ | ○ |
| | 101 | 5 | × | ○ | ○ | ○ |
| | 102 | 6 | × | ○ | ○ | ○ |
| | 103 | 7 | × | ○ | ○ | ○ |
| | 104 | 8 | × | ○ | ○ | ○ |
| | 105 | 9 | × | ○ | ○ | ○ |
| | 106 | 10 | × | ○ | ○ | ○ |
| | 107 | 11 | × | ○ | ○ | ○ |
| | 108 | 12 | ○ | ○ | ○ | × |
| | 109 | 13 | ○ | ○ | ○ | × |
| | 110 | 14 | ○ | ○ | ○ | × |
| | 111 | 15 | ○ | ○ | ○ | × |
| G7 | 112 | 0 | × | ○ | ○ | ○ |
| | 113 | 1 | × | ○ | ○ | ○ |
| | 114 | 2 | × | ○ | ○ | ○ |
| | 115 | 3 | × | ○ | ○ | ○ |
| | 116 | 4 | × | ○ | ○ | ○ |
| | 117 | 5 | × | ○ | ○ | ○ |
| | 118 | 6 | × | ○ | ○ | ○ |
| | 119 | 7 | × | ○ | ○ | ○ |
| | 120 | 8 | × | ○ | ○ | ○ |
| | 121 | 9 | × | ○ | ○ | ○ |
| | 122 | 10 | × | ○ | ○ | ○ |
| | 123 | 11 | × | ○ | ○ | ○ |
| | 124 | 12 | × | ○ | ○ | ○ |
| | 125 | 13 | × | ○ | ○ | ○ |
| | 126 | 14 | ○ | ○ | ○ | × |
| | 127 | 15 | ○ | ○ | ○ | × |

B

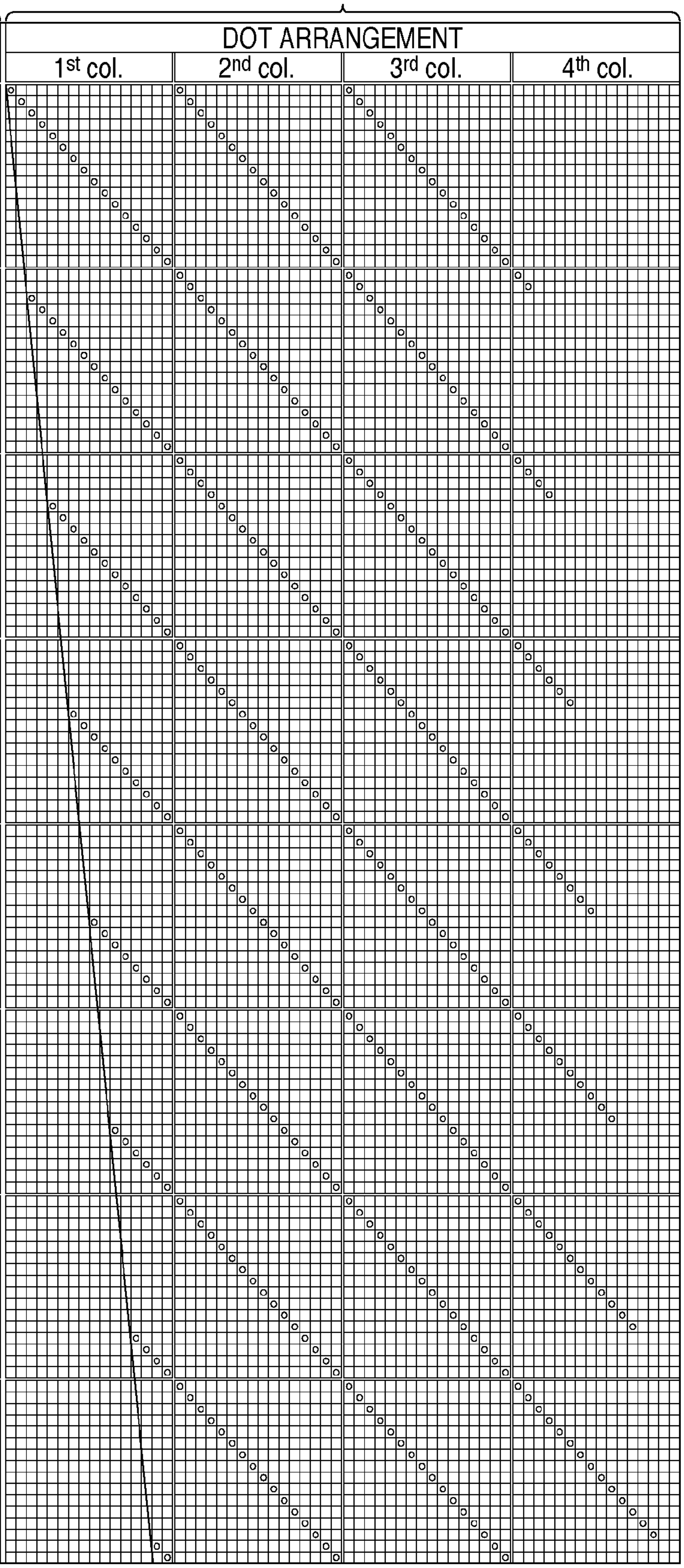

FIG. 10

BLOCK DRIVING SEQUENCE DATA

| | | | | |
|---|---|---|---|---|
| ADDRESS 0 | 0 | 0 | 0 | 0 |
| | 0 | 0 | 0 | 1 |
| | 0 | 0 | 1 | 0 |
| | 0 | 0 | 1 | 1 |
| | 0 | 1 | 0 | 0 |
| | 0 | 1 | 0 | 1 |
| | 0 | 1 | 1 | 0 |
| | 0 | 1 | 1 | 1 |
| | 1 | 0 | 0 | 0 |
| | 1 | 0 | 0 | 1 |
| | 1 | 0 | 1 | 0 |
| | 1 | 0 | 1 | 1 |
| | 1 | 1 | 0 | 0 |
| | 1 | 1 | 0 | 1 |
| | 1 | 1 | 1 | 0 |
| ADDRESS 15 | 1 | 1 | 1 | 1 |

FIG. 18

| | PRINTING ELEMENT NUMBER | SLANT CORRECTION AMOUNT |
|---|---|---|
| GROUP 0 | 0 ~ 15 | 0 |
| GROUP 1 | 16 ~ 31 | 2 |
| GROUP 2 | 32 ~ 47 | 4 |
| GROUP 3 | 48 ~ 63 | 6 |
| GROUP 4 | 64 ~ 79 | 8 |
| GROUP 5 | 80 ~ 95 | 10 |
| GROUP 6 | 96 ~ 111 | 12 |
| GROUP 7 | 112 ~ 127 | 14 |

FIG. 19

A

| | NZL | SBK | DATA 1st col. | DATA 2nd col. | DATA 3rd col. | DATA 4th col. |
|---|---|---|---|---|---|---|
| G0 | 0 | 0 | O | O | O | × |
| | 1 | 3 | O | O | O | × |
| | 2 | 6 | O | O | O | × |
| | 3 | 9 | O | O | O | × |
| | 4 | 12 | O | O | O | × |
| | 5 | 15 | O | O | O | × |
| | 6 | 2 | O | O | O | × |
| | 7 | 5 | O | O | O | × |
| | 8 | 8 | O | O | O | × |
| | 9 | 11 | O | O | O | × |
| | 10 | 14 | O | O | O | × |
| | 11 | 1 | O | O | O | × |
| | 12 | 4 | O | O | O | × |
| | 13 | 7 | O | O | O | × |
| | 14 | 10 | O | O | O | × |
| | 15 | 13 | O | O | O | × |
| G1 | 16 | 0 | × | O | O | O |
| | 17 | 3 | O | O | O | × |
| | 18 | 6 | O | O | O | × |
| | 19 | 9 | O | O | O | × |
| | 20 | 12 | O | O | O | × |
| | 21 | 15 | O | O | O | × |
| | 22 | 2 | O | O | O | × |
| | 23 | 5 | O | O | O | × |
| | 24 | 8 | O | O | O | × |
| | 25 | 11 | O | O | O | × |
| | 26 | 14 | O | O | O | × |
| | 27 | 1 | O | O | O | × |
| | 28 | 4 | O | O | O | × |
| | 29 | 7 | O | O | O | × |
| | 30 | 10 | O | O | O | × |
| | 31 | 13 | O | O | O | × |
| G2 | 32 | 0 | × | O | O | O |
| | 33 | 3 | O | O | O | × |
| | 34 | 6 | O | O | O | × |
| | 35 | 9 | O | O | O | × |
| | 36 | 12 | O | O | O | × |
| | 37 | 15 | O | O | O | × |
| | 38 | 2 | O | O | O | × |
| | 39 | 5 | O | O | O | × |
| | 40 | 8 | O | O | O | × |
| | 41 | 11 | O | O | O | × |
| | 42 | 14 | O | O | O | × |
| | 43 | 1 | × | O | O | O |
| | 44 | 4 | O | O | O | × |
| | 45 | 7 | O | O | O | × |
| | 46 | 10 | O | O | O | × |
| | 47 | 13 | O | O | O | × |
| G3 | 48 | 0 | × | O | O | O |
| | 49 | 3 | O | O | O | O |
| | 50 | 6 | O | O | O | × |
| | 51 | 9 | O | O | O | × |
| | 52 | 12 | O | O | O | × |
| | 53 | 15 | O | O | O | × |
| | 54 | 2 | × | O | O | O |
| | 55 | 5 | O | O | O | × |
| | 56 | 8 | O | O | O | × |
| | 57 | 11 | O | O | O | × |
| | 58 | 14 | O | O | O | × |
| | 59 | 1 | × | O | O | O |
| | 60 | 4 | O | O | O | × |
| | 61 | 7 | O | O | O | × |
| | 62 | 10 | O | O | O | × |
| | 63 | 13 | × | O | O | × |
| G4 | 64 | 0 | × | O | O | O |
| | 65 | 3 | × | O | O | O |
| | 66 | 6 | O | O | O | × |
| | 67 | 9 | O | O | O | × |
| | 68 | 12 | O | O | O | × |
| | 69 | 15 | O | O | O | × |
| | 70 | 2 | × | O | O | O |
| | 71 | 5 | O | O | O | × |
| | 72 | 8 | O | O | O | × |
| | 73 | 11 | O | O | O | × |
| | 74 | 14 | O | O | O | × |
| | 75 | 1 | × | O | O | O |
| | 76 | 4 | O | O | O | × |
| | 77 | 7 | O | O | O | × |
| | 78 | 10 | O | O | O | × |
| | 79 | 13 | O | O | O | × |
| G5 | 80 | 0 | × | O | O | O |
| | 81 | 3 | × | O | O | O |
| | 82 | 6 | O | O | O | × |
| | 83 | 9 | O | O | O | × |
| | 84 | 12 | O | O | O | × |
| | 85 | 15 | O | O | O | × |
| | 86 | 2 | × | O | O | O |
| | 87 | 5 | O | O | O | × |
| | 88 | 8 | O | O | O | × |
| | 89 | 11 | O | O | O | × |
| | 90 | 14 | O | O | O | × |
| | 91 | 1 | × | O | O | O |
| | 92 | 4 | × | O | O | O |
| | 93 | 7 | O | O | O | × |
| | 94 | 10 | O | O | O | × |
| | 95 | 13 | O | O | O | × |
| G6 | 96 | 0 | × | O | O | O |
| | 97 | 3 | × | O | O | O |
| | 98 | 6 | O | O | O | × |
| | 99 | 9 | O | O | O | × |
| | 100 | 12 | O | O | O | × |
| | 101 | 15 | O | O | O | × |
| | 102 | 2 | × | O | O | O |
| | 103 | 5 | × | O | O | O |
| | 104 | 8 | O | O | O | × |
| | 105 | 11 | O | O | O | × |
| | 106 | 14 | O | O | O | × |
| | 107 | 1 | × | O | O | O |
| | 108 | 4 | × | O | O | O |
| | 109 | 7 | O | O | O | × |
| | 110 | 10 | O | O | O | × |
| | 111 | 13 | O | O | O | × |
| G7 | 112 | 0 | × | O | O | O |
| | 113 | 3 | × | O | O | O |
| | 114 | 6 | × | O | O | O |
| | 115 | 9 | O | O | O | × |
| | 116 | 12 | O | O | O | × |
| | 117 | 15 | O | O | O | × |
| | 118 | 2 | × | O | O | O |
| | 119 | 5 | × | O | O | O |
| | 120 | 8 | O | O | O | × |
| | 121 | 11 | O | O | O | × |
| | 122 | 14 | O | O | O | × |
| | 123 | 1 | × | O | O | O |
| | 124 | 4 | × | O | O | O |
| | 125 | 7 | O | O | O | × |
| | 126 | 10 | O | O | O | × |
| | 127 | 13 | O | O | O | × |

B

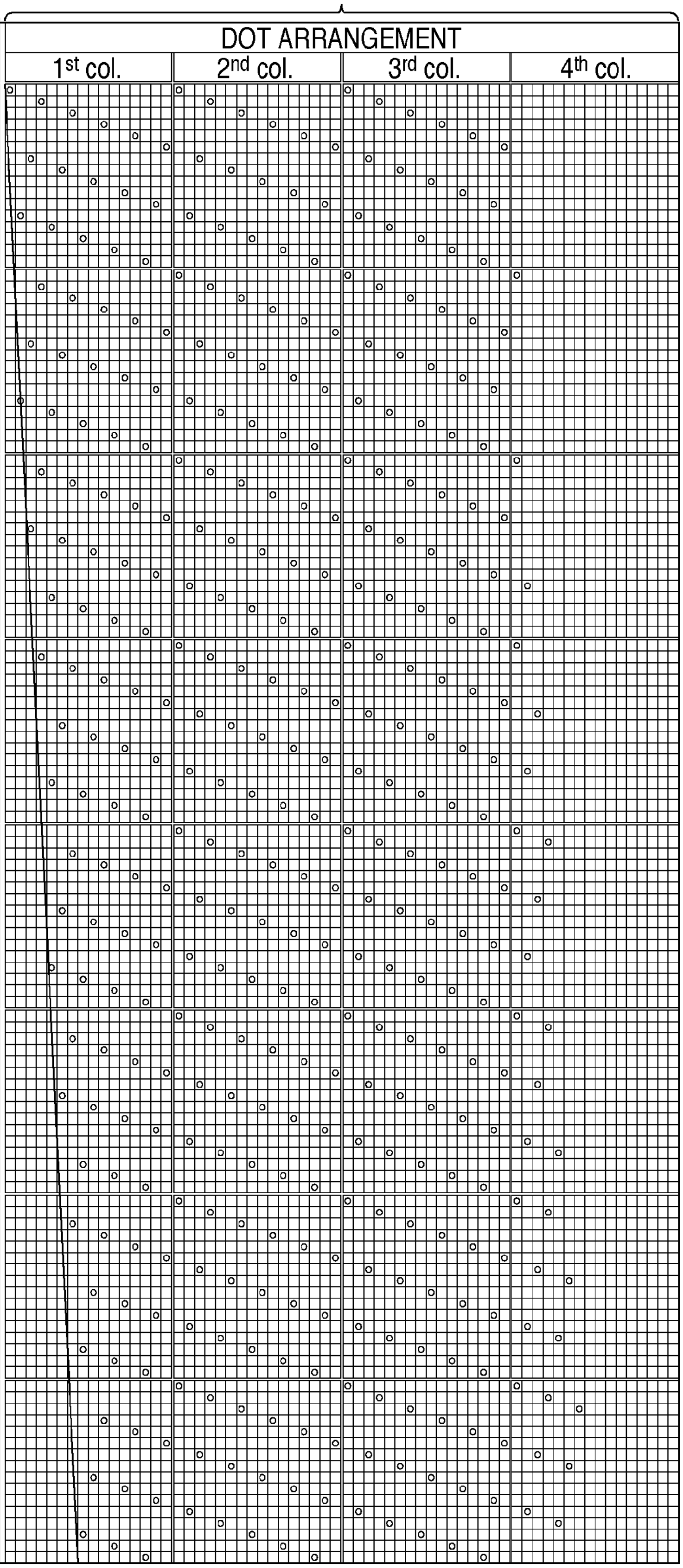

FIG. 22

| | BANK 0 | BANK 1 |
|---|---|---|
| GROUP 0 | 0h-1eh | 100h-11eh |
| GROUP 1 | 20h-3eh | 120h-13eh |
| GROUP 2 | 40h-5eh | 140h-15eh |
| GROUP 3 | 60h-7eh | 160h-17eh |
| GROUP 4 | 80h-94eh | 180h-194eh |
| GROUP 5 | a0h-beh | 1a0h-1beh |
| GROUP 6 | c0h-deh | 1c0h-1deh |
| GROUP 7 | e0h-feh | 1e0h-1feh |

FIG. 24

| | | BANK 0 | BANK 1 | BANK 2 |
|---|---|---|---|---|
| BLOCK 0 | b0 b7 | Ad00h | Ad10h | Ad20h |
| BLOCK 1 | b0 b7 | Ad01h | Ad11h | Ad21h |
| BLOCK 2 | b0 b7 | Ad02h | Ad12h | Ad22h |
| BLOCK 3 | b0 b7 | Ad03h | Ad13h | Ad23h |
| BLOCK 4 | b0 b7 | Ad04h | Ad14h | Ad24h |
| BLOCK 5 | b0 b7 | Ad05h | Ad15h | Ad25h |
| BLOCK 6 | b0 b7 | Ad06h | Ad16h | Ad26h |
| BLOCK 7 | b0 b7 | Ad07h | Ad17h | Ad27h |
| BLOCK 8 | b0 b7 | Ad08h | Ad18h | Ad28h |
| BLOCK 9 | b0 b7 | Ad09h | Ad19h | Ad29h |
| BLOCK 10 | b0 b7 | Ad0ah | Ad1ah | Ad2ah |
| BLOCK 11 | b0 b7 | Ad0bh | Ad1bh | Ad2bh |
| BLOCK 12 | b0 b7 | Ad0ch | Ad1ch | Ad2ch |
| BLOCK 13 | b0 b7 | Ad0dh | Ad1dh | Ad2dh |
| BLOCK 14 | b0 b7 | Ad0eh | Ad1eh | Ad2eh |
| BLOCK 15 | b0 b7 | Ad0fh | Ad1fh | Ad2fh |

FIG. 30

| | | | | | | | | | | | | | | | | | |
|---|---|---|---|---|---|---|---|---|---|---|---|---|---|---|---|---|---|
| | N | 0 | 1 | 2 | 3 | 4 | 5 | 6 | 7 | 8 | 9 | 10 | 11 | 12 | 13 | 14 | 15 |
| | S | 0 | 1 | 2 | 3 | 4 | 5 | 6 | 7 | 8 | 9 | 10 | 11 | 12 | 13 | 14 | 15 |
| CORRECTION VALUE | TRIGGER SIGNAL | | | | | | | | | | | | | | | | |
| 0 | GROUP 0 | 0 | 11 | 6 | 1 | 12 | 7 | 2 | 13 | 8 | 3 | 14 | 9 | 4 | 15 | 10 | 5 |
| 1 | GROUP 1 | | 11 | 6 | 1 | 12 | 7 | 2 | 13 | 8 | 3 | 14 | 9 | 4 | 15 | 10 | 5 |
| 2 | GROUP 2 | | | 6 | 1 | 12 | 7 | 2 | 13 | 8 | 3 | 14 | 9 | 4 | 15 | 10 | 5 |
| 3 | GROUP 3 | | | | 1 | 12 | 7 | 2 | 13 | 8 | 3 | 14 | 9 | 4 | 15 | 10 | 5 |
| 4 | GROUP 4 | | | | | 12 | 7 | 2 | 13 | 8 | 3 | 14 | 9 | 4 | 15 | 10 | 5 |
| 5 | GROUP 5 | | | | | | 7 | 2 | 13 | 8 | 3 | 14 | 9 | 4 | 15 | 10 | 5 |
| 6 | GROUP 6 | | | | | | | 2 | 13 | 8 | 3 | 14 | 9 | 4 | 15 | 10 | 5 |
| 7 | GROUP 7 | | | | | | | | 13 | 8 | 3 | 14 | 9 | 4 | 15 | 10 | 5 |

| | | | | | | | | | | | | | | | | | |
|---|---|---|---|---|---|---|---|---|---|---|---|---|---|---|---|---|---|
| | N | 0 | 1 | 2 | 3 | 4 | 5 | 6 | 7 | 8 | 9 | 10 | 11 | 12 | 13 | 14 | 15 |
| | S | 16 | 17 | 18 | 19 | 20 | 21 | 22 | 23 | 24 | 25 | 26 | 27 | 28 | 29 | 30 | 31 |
| CORRECTION VALUE | TRIGGER SIGNAL | | | | | | | | | | | | | | | | |
| 0 | GROUP 0 | 0 | 11 | 6 | 1 | 12 | 7 | 2 | 13 | 8 | 3 | 14 | 9 | 4 | 15 | 10 | 5 |
| 1 | GROUP 1 | 0 | 11 | 6 | 1 | 12 | 7 | 2 | 13 | 8 | 3 | 14 | 9 | 4 | 15 | 10 | 5 |
| 2 | GROUP 2 | 0 | 11 | 6 | 1 | 12 | 7 | 2 | 13 | 8 | 3 | 14 | 9 | 4 | 15 | 10 | 5 |
| 3 | GROUP 3 | 0 | 11 | 6 | 1 | 12 | 7 | 2 | 13 | 8 | 3 | 14 | 9 | 4 | 15 | 10 | 5 |
| 4 | GROUP 4 | 0 | 11 | 6 | 1 | 12 | 7 | 2 | 13 | 8 | 3 | 14 | 9 | 4 | 15 | 10 | 5 |
| 5 | GROUP 5 | 0 | 11 | 6 | 1 | 12 | 7 | 2 | 13 | 8 | 3 | 14 | 9 | 4 | 15 | 10 | 5 |
| 6 | GROUP 6 | 0 | 11 | 6 | 1 | 12 | 7 | 2 | 13 | 8 | 3 | 14 | 9 | 4 | 15 | 10 | 5 |
| 7 | GROUP 7 | 0 | 11 | 6 | 1 | 12 | 7 | 2 | 13 | 8 | 3 | 14 | 9 | 4 | 15 | 10 | 5 |

| | | | | | | | | | | | | | | | | | |
|---|---|---|---|---|---|---|---|---|---|---|---|---|---|---|---|---|---|
| | N | 0 | 1 | 2 | 3 | 4 | 5 | 6 | 7 | 8 | 9 | 10 | 11 | 12 | 13 | 14 | 15 |
| | S | 32 | 33 | 34 | 35 | 36 | 37 | 38 | 39 | 40 | 41 | 42 | 43 | 44 | 45 | 46 | 47 |
| CORRECTION VALUE | TRIGGER SIGNAL | | | | | | | | | | | | | | | | |
| 0 | GROUP 0 | 0 | 11 | 6 | 1 | 12 | 7 | 2 | 13 | 8 | 3 | 14 | 9 | 4 | 15 | 10 | 5 |
| 1 | GROUP 1 | 0 | 11 | 6 | 1 | 12 | 7 | 2 | 13 | 8 | 3 | 14 | 9 | 4 | 15 | 10 | 5 |
| 2 | GROUP 2 | 0 | 11 | 6 | 1 | 12 | 7 | 2 | 13 | 8 | 3 | 14 | 9 | 4 | 15 | 10 | 5 |
| 3 | GROUP 3 | 0 | 11 | 6 | 1 | 12 | 7 | 2 | 13 | 8 | 3 | 14 | 9 | 4 | 15 | 10 | 5 |
| 4 | GROUP 4 | 0 | 11 | 6 | 1 | 12 | 7 | 2 | 13 | 8 | 3 | 14 | 9 | 4 | 15 | 10 | 5 |
| 5 | GROUP 5 | 0 | 11 | 6 | 1 | 12 | 7 | 2 | 13 | 8 | 3 | 14 | 9 | 4 | 15 | 10 | 5 |
| 6 | GROUP 6 | 0 | 11 | 6 | 1 | 12 | 7 | 2 | 13 | 8 | 3 | 14 | 9 | 4 | 15 | 10 | 5 |
| 7 | GROUP 7 | 0 | 11 | 6 | 1 | 12 | 7 | 2 | 13 | 8 | 3 | 14 | 9 | 4 | 15 | 10 | 5 |

| | | | | | | | | | | | | | | | | | |
|---|---|---|---|---|---|---|---|---|---|---|---|---|---|---|---|---|---|
| | N | 0 | 1 | 2 | 3 | 4 | 5 | 6 | 7 | 8 | 9 | 10 | 11 | 12 | 13 | 14 | 15 |
| | S | 48 | 49 | 50 | 51 | 52 | 53 | 54 | 55 | 56 | 57 | 58 | 59 | 60 | 61 | 62 | 63 |
| CORRECTION VALUE | TRIGGER SIGNAL | | | | | | | | | | | | | | | | |
| 0 | GROUP 0 | | | | | | | | | | | | | | | | |
| 1 | GROUP 1 | 0 | | | | | | | | | | | | | | | |
| 2 | GROUP 2 | 0 | 11 | | | | | | | | | | | | | | |
| 3 | GROUP 3 | 0 | 11 | 6 | | | | | | | | | | | | | |
| 4 | GROUP 4 | 0 | 11 | 6 | 1 | | | | | | | | | | | | |
| 5 | GROUP 5 | 0 | 11 | 6 | 1 | 12 | | | | | | | | | | | |
| 6 | GROUP 6 | 0 | 11 | 6 | 1 | 12 | 7 | | | | | | | | | | |
| 7 | GROUP 7 | 0 | 11 | 6 | 1 | 12 | 7 | 2 | | | | | | | | | |

FIG. 34

A

| | NZL | SBK | DATA 1st col. | DATA 2nd col. | DATA 3rd col. | DATA 4th col. |
|---|---|---|---|---|---|---|
| G0 | 0 | 0 | O | O | O | × |
| | 1 | 1 | O | O | O | × |
| | 2 | 2 | O | O | O | × |
| | 3 | 3 | O | O | O | × |
| | 4 | 4 | O | O | O | × |
| | 5 | 5 | O | O | O | × |
| | 6 | 6 | O | O | O | × |
| | 7 | 7 | O | O | O | × |
| | 8 | 8 | O | O | O | × |
| | 9 | 9 | O | O | O | × |
| | 10 | 10 | O | O | O | × |
| | 11 | 11 | O | O | O | × |
| | 12 | 12 | O | O | O | × |
| | 13 | 13 | O | O | O | × |
| | 14 | 14 | O | O | O | × |
| | 15 | 15 | O | O | O | × |
| G1 | 16 | 0 | O | O | O | × |
| | 17 | 1 | O | O | O | × |
| | 18 | 2 | O | O | O | × |
| | 19 | 3 | O | O | O | × |
| | 20 | 4 | O | O | O | × |
| | 21 | 5 | O | O | O | × |
| | 22 | 6 | O | O | O | × |
| | 23 | 7 | O | O | O | × |
| | 24 | 8 | O | O | O | × |
| | 25 | 9 | O | O | O | × |
| | 26 | 10 | O | O | O | × |
| | 27 | 11 | O | O | O | × |
| | 28 | 12 | O | O | O | × |
| | 29 | 13 | O | O | O | × |
| | 30 | 14 | O | O | O | × |
| | 31 | 15 | O | O | O | × |
| G2 | 32 | 0 | O | O | O | × |
| | 33 | 1 | O | O | O | × |
| | 34 | 2 | O | O | O | × |
| | 35 | 3 | O | O | O | × |
| | 36 | 4 | O | O | O | × |
| | 37 | 5 | O | O | O | × |
| | 38 | 6 | O | O | O | × |
| | 39 | 7 | O | O | O | × |
| | 40 | 8 | O | O | O | × |
| | 41 | 9 | O | O | O | × |
| | 42 | 10 | O | O | O | × |
| | 43 | 11 | O | O | O | × |
| | 44 | 12 | O | O | O | × |
| | 45 | 13 | O | O | O | × |
| | 46 | 14 | O | O | O | × |
| | 47 | 15 | O | O | O | × |
| G3 | 48 | 0 | O | O | O | × |
| | 49 | 1 | O | O | O | × |
| | 50 | 2 | O | O | O | × |
| | 51 | 3 | O | O | O | × |
| | 52 | 4 | O | O | O | × |
| | 53 | 5 | O | O | O | × |
| | 54 | 6 | O | O | O | × |
| | 55 | 7 | O | O | O | × |
| | 56 | 8 | O | O | O | × |
| | 57 | 9 | O | O | O | × |
| | 58 | 10 | O | O | O | × |
| | 59 | 11 | O | O | O | × |
| | 60 | 12 | O | O | O | × |
| | 61 | 13 | O | O | O | × |
| | 62 | 14 | O | O | O | × |
| | 63 | 15 | O | O | O | × |
| G4 | 64 | 0 | × | O | O | O |
| | 65 | 1 | × | O | O | O |
| | 66 | 2 | × | O | O | O |
| | 67 | 3 | × | O | O | O |
| | 68 | 4 | × | O | O | O |
| | 69 | 5 | × | O | O | O |
| | 70 | 6 | × | O | O | O |
| | 71 | 7 | × | O | O | O |
| | 72 | 8 | × | O | O | O |
| | 73 | 9 | × | O | O | O |
| | 74 | 10 | × | O | O | O |
| | 75 | 11 | × | O | O | O |
| | 76 | 12 | × | O | O | O |
| | 77 | 13 | × | O | O | O |
| | 78 | 14 | × | O | O | O |
| | 79 | 15 | × | O | O | O |
| G5 | 80 | 0 | × | O | O | O |
| | 81 | 1 | × | O | O | O |
| | 82 | 2 | × | O | O | O |
| | 83 | 3 | × | O | O | O |
| | 84 | 4 | × | O | O | O |
| | 85 | 5 | × | O | O | O |
| | 86 | 6 | × | O | O | O |
| | 87 | 7 | × | O | O | O |
| | 88 | 8 | × | O | O | O |
| | 89 | 9 | × | O | O | O |
| | 90 | 10 | × | O | O | O |
| | 91 | 11 | × | O | O | O |
| | 92 | 12 | × | O | O | O |
| | 93 | 13 | × | O | O | O |
| | 94 | 14 | × | O | O | O |
| | 95 | 15 | × | O | O | O |
| G6 | 96 | 0 | × | O | O | O |
| | 97 | 1 | × | O | O | O |
| | 98 | 2 | × | O | O | O |
| | 99 | 3 | × | O | O | O |
| | 100 | 4 | × | O | O | O |
| | 101 | 5 | × | O | O | O |
| | 102 | 6 | × | O | O | O |
| | 103 | 7 | × | O | O | O |
| | 104 | 8 | × | O | O | O |
| | 105 | 9 | × | O | O | O |
| | 106 | 10 | × | O | O | O |
| | 107 | 11 | × | O | O | O |
| | 108 | 12 | × | O | O | O |
| | 109 | 13 | × | O | O | O |
| | 110 | 14 | × | O | O | O |
| | 111 | 15 | × | O | O | O |
| G7 | 112 | 0 | × | O | O | O |
| | 113 | 1 | × | O | O | O |
| | 114 | 2 | × | O | O | O |
| | 115 | 3 | × | O | O | O |
| | 116 | 4 | × | O | O | O |
| | 117 | 5 | × | O | O | O |
| | 118 | 6 | × | O | O | O |
| | 119 | 7 | × | O | O | O |
| | 120 | 8 | × | O | O | O |
| | 121 | 9 | × | O | O | O |
| | 122 | 10 | × | O | O | O |
| | 123 | 11 | × | O | O | O |
| | 124 | 12 | × | O | O | O |
| | 125 | 13 | × | O | O | O |
| | 126 | 14 | × | O | O | O |
| | 127 | 15 | × | O | O | O |

B

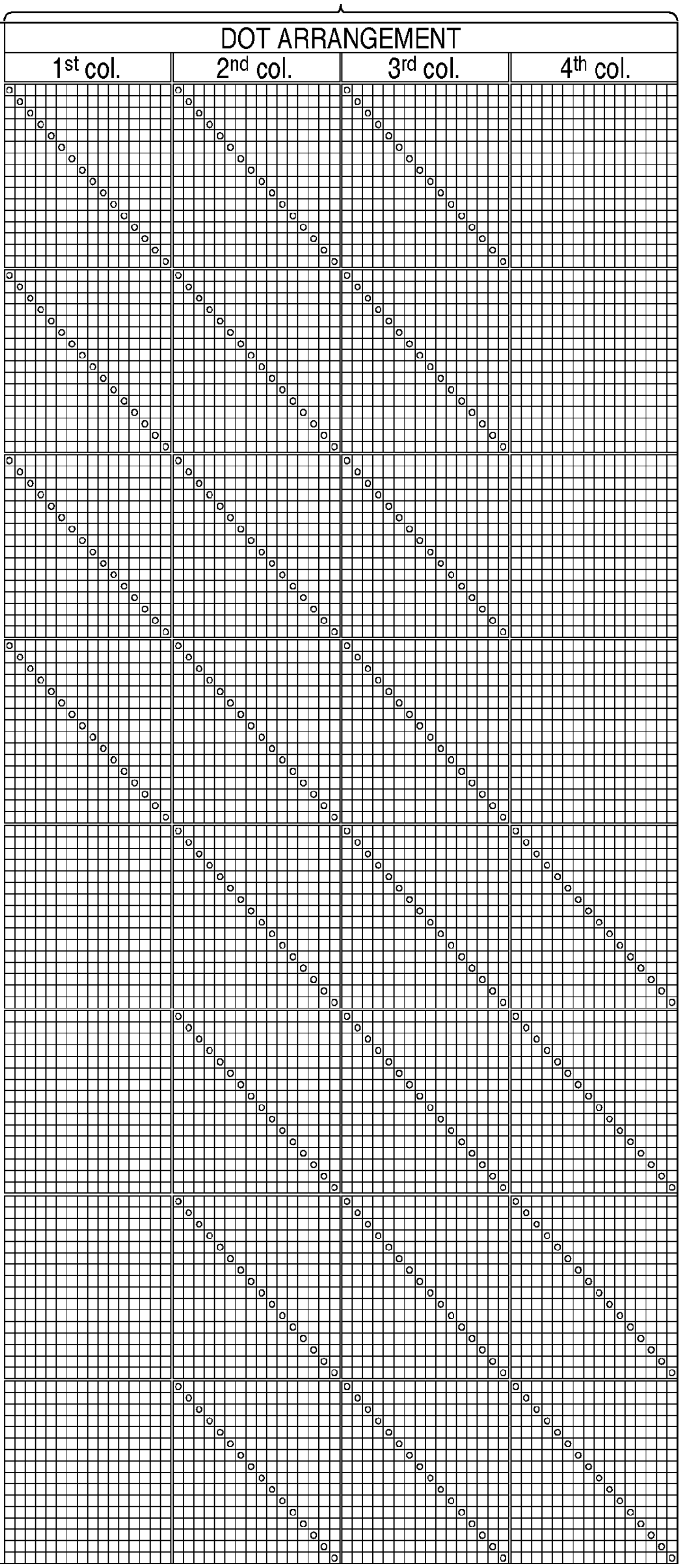

PRINTING APPARATUS AND CONTROL METHOD THEREFOR

BACKGROUND OF THE INVENTION

1. Field of the Invention

The present invention relates to a printing apparatus which prints an image based on image data on a printing medium by discharging ink droplets from ink orifices formed in a printhead, and a control method therefor. More particularly, the present invention relates to a printing apparatus capable of obtaining a high-quality image by correcting dot displacement caused by the setting angle of the printhead or the like, and a control method therefor.

2. Description of the Related Art

An inkjet printing apparatus generally comprises a printhead in which ink orifices and printing elements such as heaters or piezoelectric elements serving as energy generation means for discharging ink droplets are arrayed in correspondence with each other. The inkjet printing apparatus prints an image on a printing medium by repeating print scanning of discharging ink droplets to a printing area while moving the printhead in the main scanning direction, and conveyance of the printing medium in the sub-scanning direction intersecting the main scanning direction.

Due to the rise of cost of the power supply and the like, it is difficult to equip the inkjet printing apparatus with a power capacity enough to simultaneously discharge ink droplets from all the ink orifices of each ink orifice array of the printhead. Thus, the printing elements are time-divisionally driven. The time-divisional driving will be explained. The printing elements of each ink orifice array are divided into a plurality of groups, and printing elements in each group are assigned to different blocks. Printing elements are sequentially driven for the respective blocks, and all the printing elements are driven by going around all the blocks. This time-divisional driving is repeated in print scanning in the main scanning direction, printing in a printing area corresponding to one scanning.

In the inkjet printing apparatus, the printhead may slantingly be mounted in the inkjet printing apparatus due to a mounting error when mounting the printhead in the inkjet printing apparatus or an error when assembling the printhead. In some cases, dot displacement corresponding to the slanting angle, i.e., so-called slanting displacement may occur.

The slanting displacement will be described in detail with reference to FIGS. 33 and 4.

FIG. 33 shows the arrangement of dots formed on a printing medium 12 when the printhead is ideally mounted in the inkjet printing apparatus without any slanting displacement. In FIG. 33, a printhead 11 is mounted in the inkjet printing apparatus with an ink orifice array arranged parallel to the sub-scanning direction indicated by an arrow B. The printhead 11 prints while moving on the printing medium 12 from left to right along the main scanning direction indicated by an arrow A. The printing medium 12 is conveyed in the direction of the arrow B. The upper side in FIG. 33 is the upstream side in the sub-scanning direction, and the lower side is the downstream side in the sub-scanning direction.

Printing elements corresponding to 128 ink orifices 13 of the printhead 11 are divided into 8 groups 0 (G0) to 7 (G7) each including 16 printing elements. Printing elements in each group are assigned to different blocks, and printing elements in the same blocks are sequentially driven. In FIG. 33, printing elements are divided into groups 0 to 7 by 16 printing elements from a printing element on the upstream side in the sub-scanning direction. Printing elements in each group are assigned to blocks 0 to 15 sequentially from a printing element on the upstream side in the sub-scanning direction. Printing elements are driven in the driving sequence of block 0→1→2→3→4→5→6→7→8→9→10→11→12→13→14→15 in one cycle.

If there is no slanting displacement, dots formed by 1-cycle driving of printing elements in blocks 0 to 15 fall within the area of the same column (width of one pixel). FIG. 33 shows the arrangement of dots formed on a printing medium when printing elements are driven in the order of blocks 0 to 15 and image data of three, first to third columns are assigned to the printing elements. Dots formed by 1-cycle driving of printing elements of each group are arranged in a predetermined area (same column), obtaining an image of a high printing quality.

FIG. 4 shows a dot arrangement when the printhead is mounted with a slope in the inkjet printing apparatus and slanting displacement occurs upon printing the same image as that in FIG. 33. FIG. 4 shows four columns of dots formed by printing elements in groups 4 to 7 in FIG. 4. In the following description, it is assumed that dots of only three left columns in FIG. 4 are formed by the printing elements of these groups. As shown in FIG. 4, dots formed on the upstream and downstream sides by printing elements assigned to the same block deviate from each other in the main scanning direction. Further, dots are formed at positions deviated from a column in which they should be originally arranged. For example, four dots corresponding to blocks 0 to 3 in group 2 are formed at positions deviated from a column area where they should be originally arranged. If slanting displacement occurs, dots are formed at positions deviated from an area where they should be originally arranged, lowering the image quality.

To prevent this, there is proposed a technique of correcting slanting displacement. More specifically, an inkjet printing apparatus comprises a means for detecting information on slanting displacement. The discharge timing of the printhead is changed based on the detected information on slanting displacement.

Japanese Patent Laid-Open No. 2004-09489 discloses a method of changing the discharge timing of the printhead by changing the position of image data to be read out from a printing buffer for each group in accordance with the slanting displacement in an inkjet printing apparatus which time-divisionally drives printing elements to discharge ink droplets.

The slanting displacement correction method described in Japanese Patent Laid-Open No. 2004-09489 will be explained with reference to FIGS. 34 and 4.

The inkjet printing apparatus has the same configuration as that shown in FIG. 33. Printing elements are divided into 8 groups 0 (G0) to 7 (G7) each including 16 printing elements. Printing elements in each group are assigned with block numbers of 0 to 15. Printing elements in each group are driven in the driving sequence of block 0→1→2→3→4→5→6→7→8→9→10→11→12→13→14→15. Also in this description, dots are formed based on image data of three, first to third columns by using all the ink orifices 13 of the printhead 11.

In this case, the printhead 11 is mounted and slanted clockwise with respect to a conveyance direction of a printing medium. Slanting displacement occurs so that the positions of dots formed by the ink orifices 13 at the two ends of the printhead 11 deviate from each other by one column in the main scanning direction. A method of correcting this slanting displacement will be explained.

A in FIG. 34 represents nozzle numbers NZL, selection blocks SBK, and image data (printing data) DATA assigned to printing elements of groups 0 (G0) to 7 (G7). B in FIG. 34 represents the arrangement of dots printed on a printing medium in correspondence with A in FIG. 34. The dot arrangement in B of FIG. 34 schematically shows the arrangement of dots formed on a printing medium when no slanting displacement occurs. The nozzle number is virtually assigned to each printing element, and nozzle numbers of 0 to 127 are assigned to printing elements sequentially from one on the upstream side in the sub-scanning direction.

In Japanese Patent Laid-Open No. 2004-09489, the read position of image data read out from the printing buffer changes for each group in accordance with the slanting displacement. As shown in FIG. 34, the read positions of image data assigned to printing elements of groups 4 to 7 change by one column in the main scanning direction.

More specifically, image data are assigned to printing elements of groups 0 to 3 so as to form dots in the areas of the first to third columns. To the contrary, image data are assigned to printing elements of groups 4 to 7 so as to form dots in the areas of the second to fourth columns by changing the image data read position.

FIG. 4 shows the arrangement of dots actually formed on a printing medium when the image data read position changes as shown in FIG. 34. FIG. 4 shows four columns of dots formed by printing elements of groups 4 (G4) to 7 (G7). Dots of three left columns are formed without changing the image data read position, and dots of three right columns are formed by changing the read position. That is, blank dots at the positions of groups 4 to 7 on a printing medium are formed when image data of the first column are assigned to printing elements of groups 4 to 7 without correction. By slanting displacement correction disclosed in Japanese Patent Laid-Open No. 2004-09489, dots of groups 4 to 7 are formed at positions offset from the positions of blank dots to the right by one column in the main scanning direction. This slanting displacement correction can reduce the deviation amount of dots formed by printing elements of the same block in the main scanning direction.

However, the correction method proposed in Japanese Patent Laid-Open No. 2004-09489 is to change the image data read positions of all printing elements of each group by one column. In a case where dots formed by printing elements of the same group include dots arranged in a column in which they should be originally arranged, and those not arranged in it, dots arranged in the column unless they are corrected are arranged at positions deviated from the column upon correction. Even if there are dots arranged at positions deviated from a column in which they should be originally arranged, the dots are not corrected as long as the number of such dots is small. Therefore, even a group including dots arranged at positions deviated from a column in which they should be originally arranged may not be corrected.

Attention is paid to the first column of 16 dots of group 5. Unless slanting displacement correction is performed, four dots corresponding to blocks 12 to 15 are arranged in the first column, and 12 dots corresponding to the remaining blocks 0 to 11 are arranged in an area on the left side of the first column. According to this slanting displacement correction, the image data read position is changed by one column for all the printing elements of the group by assigning image data of the first column at the timing when printing an image in the area of the second column. By this correction, four dots corresponding to blocks 12 to 15 are arranged at positions deviated from the first column in which these dots should be originally arranged, i.e., arranged in the area of the second column.

As summarized, the correction method proposed in Japanese Patent Laid-Open No. 2004-09489 can reduce the displacement amount of the dot arrangement in the main scanning direction. In some cases, however, this method cannot satisfactorily reduce slanting displacement, and dots arranged in an area where they should be originally arranged are arranged at positions deviated from the area.

SUMMARY OF THE INVENTION

Accordingly, the present invention is conceived as a response to the above-described disadvantages of the conventional art.

For example, a printing apparatus according to this invention is capable of reducing slanting displacement and suppressing degradation of the image quality.

According to one aspect of the present invention, preferably, there is provided a printing apparatus which prints by dividing a plurality of printing elements into a plurality of blocks and time-divisionally driving the plurality of printing elements while a printhead having a printing element array in which the plurality of printing elements are arrayed scans based on image data in a direction intersecting an arrayed direction of the plurality of printing elements, the apparatus comprising: obtaining means for obtaining slant information of the printing element array in a scanning direction of the printhead; a printing buffer which stores the image data used to print by one scanning of the printhead; a transfer buffer which stores, for each column, image data of a plurality of columns used by the printing element array out of image data that are stored in the printing buffer and used to print by the plurality of printing elements; read control means for reading out, from the transfer buffer, for each block, image data of at least two successive columns of the printing element array out of the image data of a plurality of columns; selection means for selecting image data of a column read out by the read control means for each printing element of a block, based on the slant information; write control means for newly reading out image data of one column of the printing element array from the printing buffer, and rewriting in an area of the transfer buffer corresponding to one column of the printing element array where read-out by the read control means is completed; and transfer means for transferring the image data selected by the selection means to the printhead.

According to one aspect of the present invention, preferably, there is provided a method of controlling a printing apparatus which prints by dividing a plurality of printing elements into a plurality of blocks and time-divisionally driving the plurality of printing elements while a printhead having a printing element array in which the plurality of printing elements are arrayed scans based on image data in a direction intersecting an arrayed direction of the plurality of printing elements, the method comprising: an obtaining step of obtaining slant information of the printing element array in a scanning direction of the printhead; a step of storing, in a printing buffer, the image data used to print by one scanning of the printhead; a step of storing, in a transfer buffer for each column, image data of a plurality of columns used by the printing element array out of image data stored in the printing buffer; a read control step of reading out, from the transfer buffer for each block, image data of at least two successive columns of the printing element array out of the image data of a plurality of columns; a selection step of selecting image data of a column read out in the read control step for each printing element of a block, based on the slant information; a write control step of newly reading out image data of one column of the printing element array from the printing buffer, and rewriting in an area of the transfer buffer corresponding to one column of the printing element array where read-out in the read control step is completed; a transfer step of transferring the image data selected in the selection step to the printhead; and a printing step of printing, based on the image data transferred in the transfer step.

The invention is particularly advantageous since degradation of the image quality by slanting displacement can be suppressed by adopting a configuration capable of changing the image data read position independently for each printing element.

Further features of the present invention will become apparent from the following description of exemplary embodiments (with reference to the attached drawings).

BRIEF DESCRIPTION OF THE DRAWINGS

FIG. 1 is a view of a dot arrangement in the first embodiment;

FIG. 10 is a view of an example of data in a block driving sequence data memory;

FIG. 18 is a table of a setting example of the slanting displacement correction amount in a correction amount storage means;

FIG. 19 is a view of a dot arrangement in the second embodiment;

FIG. 22 is a view of the configuration of a nozzle buffer;

FIG. 24 is a view showing the internal configuration of a transfer buffer;

FIG. 30 is a view showing the printing data read timing in the second embodiment;

FIG. 34 is a view of the arrangement of formed dots when conventional slanting displacement correction is performed.

DESCRIPTION OF THE EMBODIMENTS

Preferred embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or make insoluble a coloring agent contained in ink applied to the print medium).

First Embodiment

[Structure of Printing Apparatus]

Figure 3:
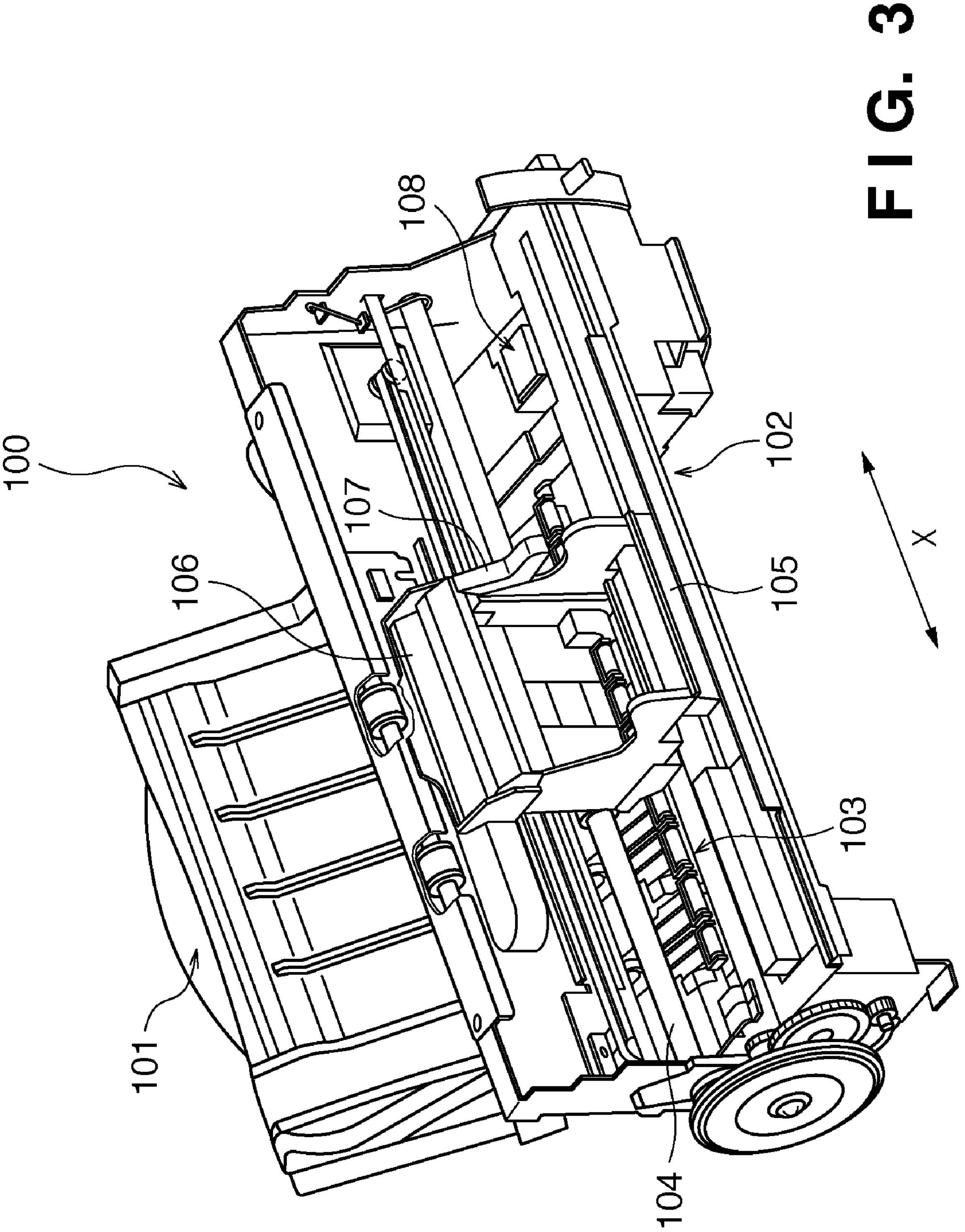
FIG. 3 is an outer perspective view showing the schematic structure of an inkjet printing apparatus.
Figure 4:
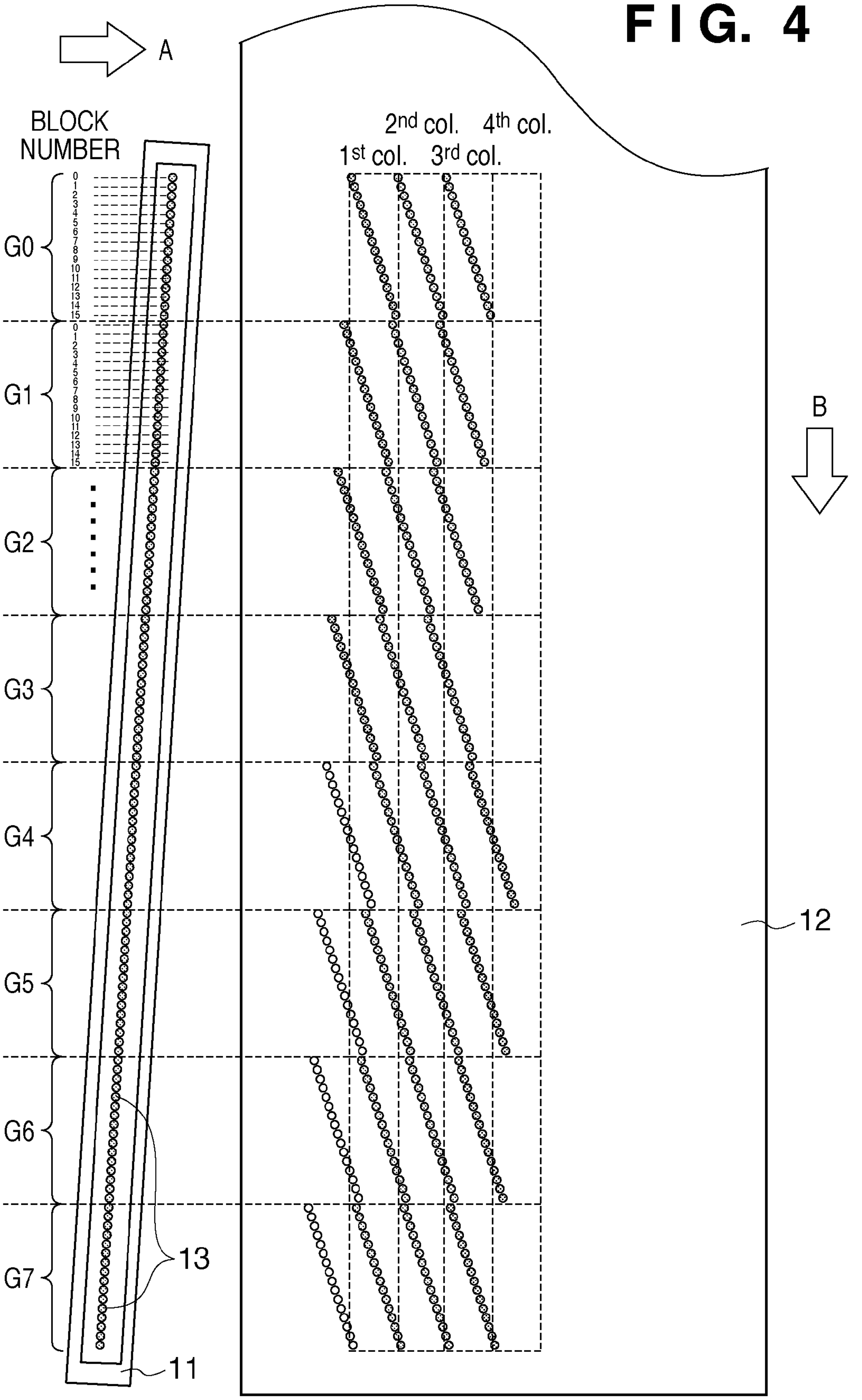
FIG. 4 is a view of the arrangement of formed dots when conventional slanting displacement correction is performed.

FIG. 3 is an outer perspective view showing the schematic structure of an inkjet printing apparatus to which the present invention is applicable. An inkjet printing apparatus 100 comprises an automatic feeder 101 which automatically feeds printing media such as paper sheets into the apparatus. The inkjet printing apparatus 100 also comprises a conveyance unit 103 which guides printing media fed one by one by the automatic feeder 101 to a predetermined printing position and guides the printing medium from the printing position to a discharge portion 102. The inkjet printing apparatus 100 further comprises a printing unit which performs desired printing on a printing medium conveyed to the printing position, and a recovery unit 108 which recovers the printing unit.

The printing unit is made up of a carriage 105 supported by a carriage shaft 104 to be movable in the main scanning direction indicated by an arrow X, and a printhead 11 (not shown) detachably mounted on the carriage 105. The printhead 11 has an array of printing elements. The main scanning direction of the arrow X corresponds to a direction which intersects the arrayed direction of the printing elements. The present invention assumes correction of a slanting error in the printing apparatus when the printhead 11 is mounted so that the main scanning direction (arrow X) diagonally intersects the arrayed direction of the printing elements.

The carriage 105 has a carriage cover 106 which engages with the carriage 105 and guides the printhead 11 to a predetermined mounting position on the carriage 105. A head set lever 107 engages with a tank holder 113 of the printhead 11 and presses the printhead 11 to set it at a predetermined mounting position.

A head set plate (not shown) is arranged on the carriage 105 to be pivotal about the head set lever shaft, and is biased by a spring to portion engaged with the printhead 11. While pressing the printhead 11 by the spring force, the head set lever 107 mounts it on the carriage 105.

[Structure of Printhead]

Figure 5:
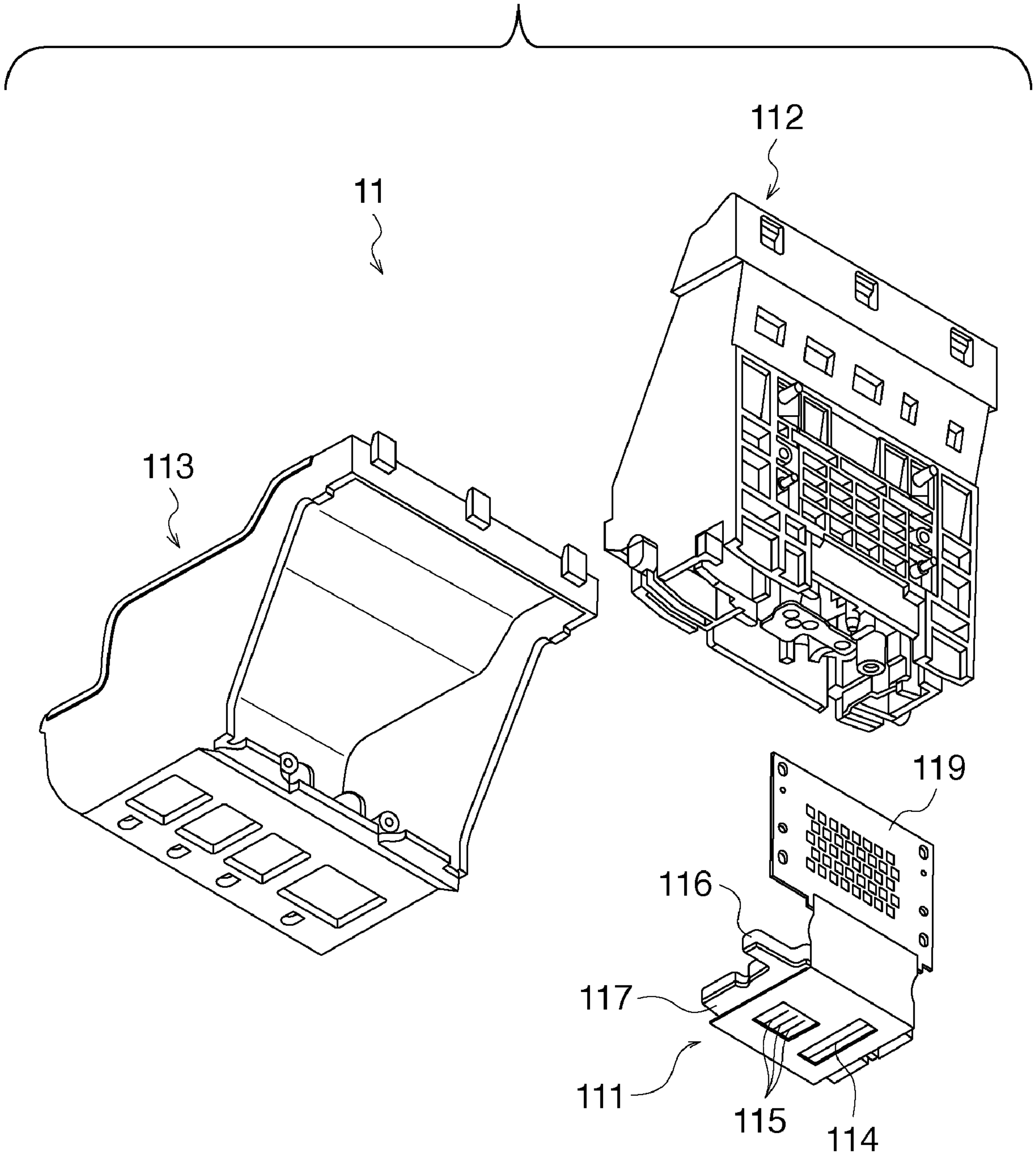
FIG. 5 is an exploded perspective view of the outer appearance of a printhead.

FIG. 5 is an exploded perspective view showing the structure of the printhead 11 to which the present invention is applicable. The printhead 11 is an inkjet printhead made up of a printing element unit 111, ink supply unit 112, and tank holder 113. The printing element unit 111 has a first printing element array 114, second printing element array 115, first plate 116, electric contact substrate 119, and second plate 117.

The first printing element array 114 and second printing element array 115 are bonded and fixed on the surface of the first plate 116. It is very difficult to assemble the first printing element array 114 and second printing element array 115 at high precision due to the mounting precision, the flowability of the adhesive, and the like. This poor assembling precision is a factor of the printhead assembling error, which is a problem to be solved by the present invention.

Figure 6A:
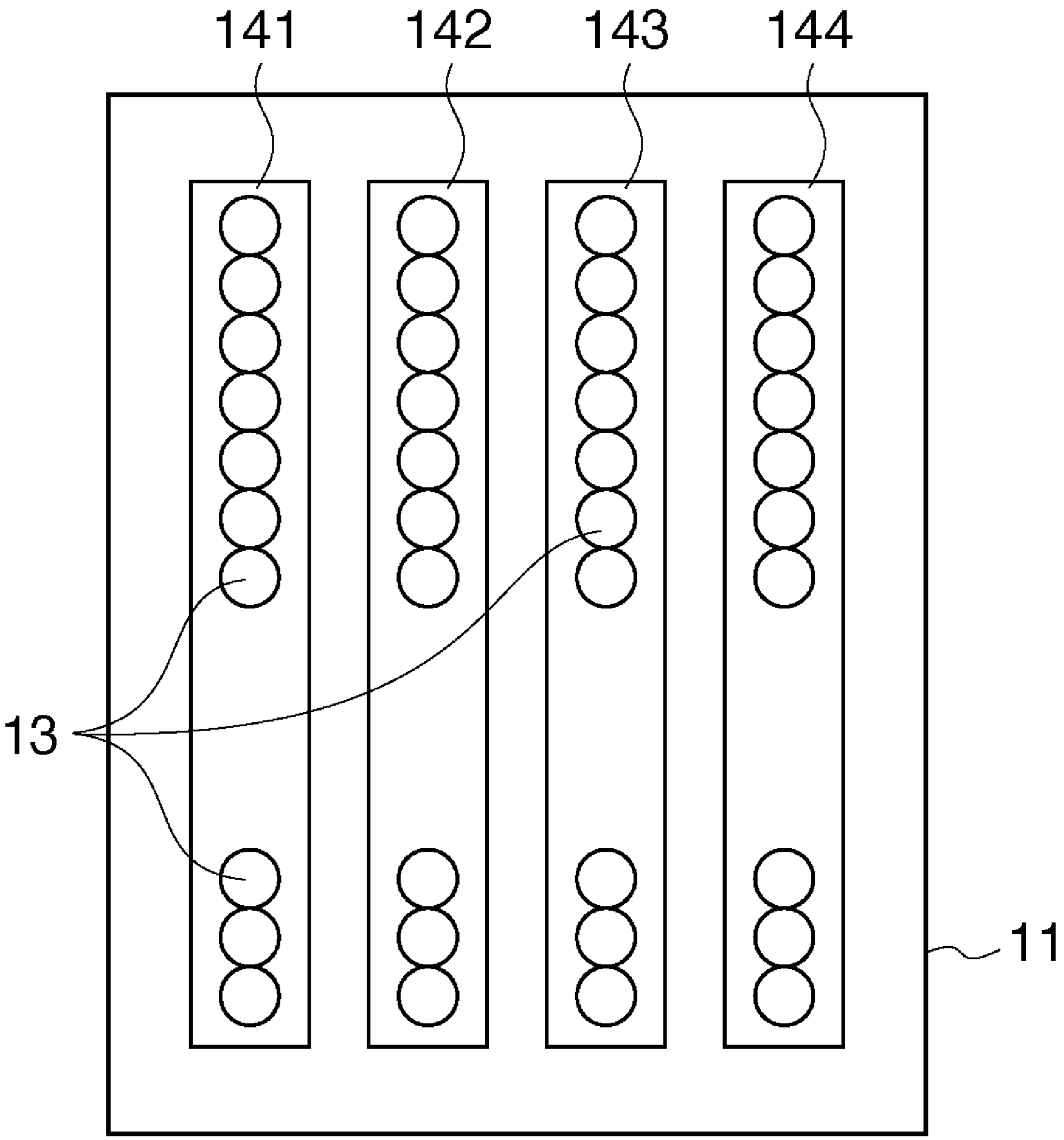
FIGS. 6A and 6B are views of the orifice array of the printhead.

FIG. 6A shows the array of ink orifices 13 on the ink orifice surface of the printhead 11. A plurality of ink orifices 13 are arrayed. Each of ink orifice arrays 141, 142, 143, and 144 which form printing-element arrays includes 128 ink orifices 13. The ink orifice arrays 141, 142, 143, and 144 discharge black, cyan, magenta, and yellow ink droplets, respectively.

A feature of the present invention is not the structure of the printhead 11, and the present invention may also adopt a configuration in which, for example, each of the ink orifice arrays 141, 142, 143, and 144 for the respective colors includes two arrays of ink orifices 13 alternately arranged in the sub-scanning direction. The present invention may also adopt a configuration in which the number of ink orifices 13 of the black ink orifice array 141 is larger than those of ink orifices 13 of the ink orifice arrays 142, 143, and 144 for the remaining colors.

In the description of the embodiment, attention is paid to one ink orifice array (black ink orifice array 141). Slanting displacement correction can be similarly performed for the remaining ink orifice arrays 142, 143, and 144.

Figure 6B:
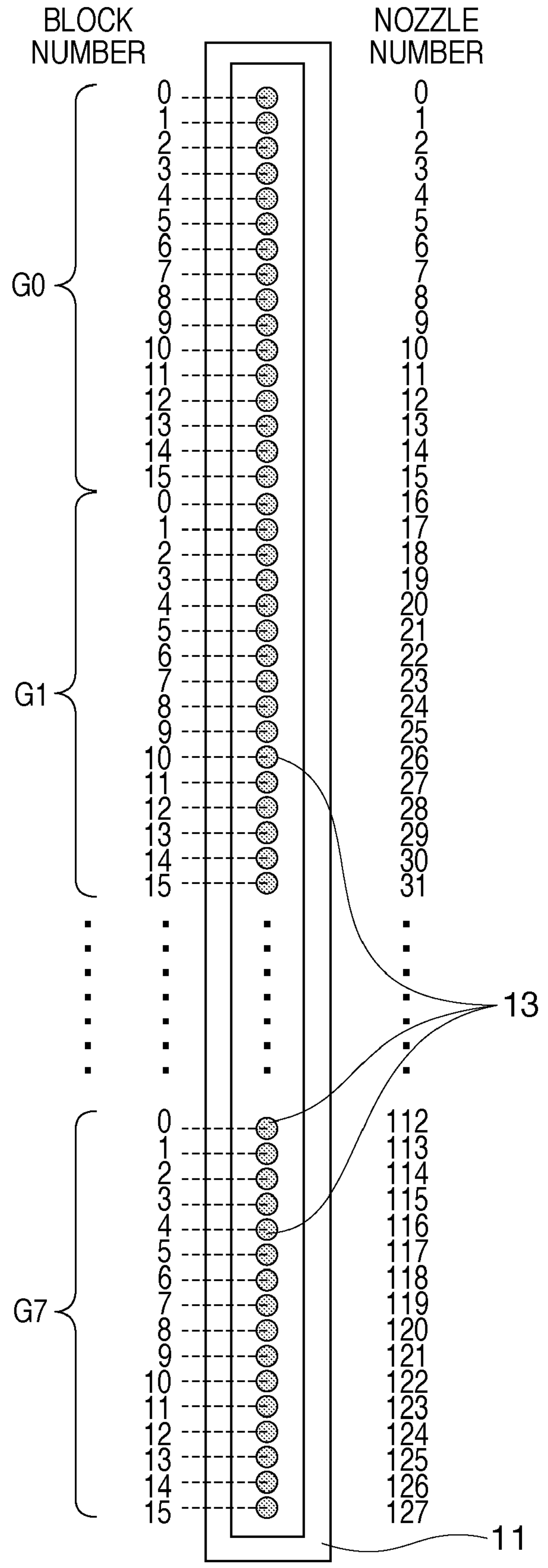

FIG. 6B shows the ink orifice surface of the printhead 11 having the ink orifice array 141 including 128 ink orifices 13. In FIG. 6A, the upper side of the ink orifice array 141 corresponds to the upstream side in the sub-scanning direction. The 128 ink orifices 13 are assigned with nozzle numbers of 0 to 127 sequentially from the upstream side to the downstream side in the sub-scanning direction. The ink orifices 13 are divided into groups 0 (G0) to 7 (G7) by 16 ink orifices in the ascending order of the nozzle number. Printing elements are assigned to blocks 0 to 15 sequentially from a printing element corresponding to an ink orifice of a small nozzle number in each group. Printing elements assigned with block numbers are time-divisionally selected to drive the selected printing elements (time-divisional driving), thereby printing an image. The embodiment will exemplify a case where an image is printed by forming dots in the areas of three columns from the position of the first column to that of the third column on a printing medium by using all the ink orifices 13 of the printhead 11.

[Block Diagram of Printing Apparatus]

Figure 7:
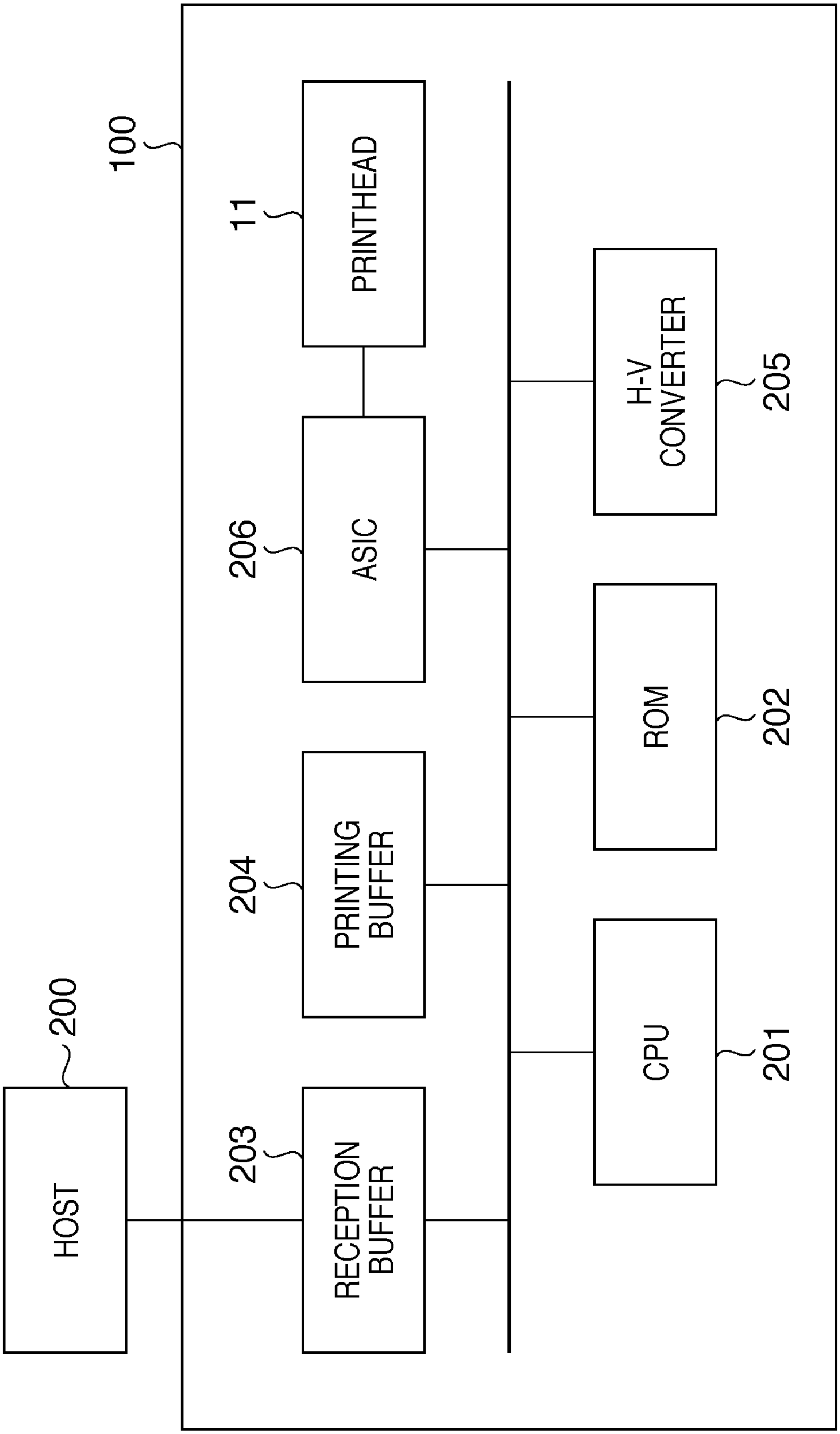
FIG. 7 is a block diagram showing the arrangement of a control circuit in the printing apparatus of the present invention.

FIG. 7 is a block diagram showing the configuration of a control circuit in the inkjet printing apparatus 100. The inkjet printing apparatus 100 comprises a CPU 201. A ROM 202 stores a control program executed by the CPU 201. Image data of each raster received from a host 200 is stored in a reception buffer 203. The image data stored in the reception buffer 203 has been compressed to reduce the transmission data amount from the host 200. The image data is, therefore, decompressed by the CPU 201 or a compressed data decompression circuit (not shown), and the decompressed image data is stored in a printing buffer 204 serving as the first image data storage means. The printing buffer 204 is, e.g., a DRAM. The format of data stored in the printing buffer 204 is the raster format. The printing buffer 204 has a capacity enough to store data by the number of rasters corresponding to the width printed by one scanning.

The image data stored in the printing buffer 204 undergoes H-V (Horizontal Vertical) conversion processing by an H-V converter 205, and is stored in a nozzle buffer 211 (column buffer) of an ASIC 206. That is, the nozzle buffer (column buffer) 211 stores data of the column format. This data format corresponds to the nozzle arrangement. The nozzle buffer 211 is, e.g., an SRAM.

Figure 9:
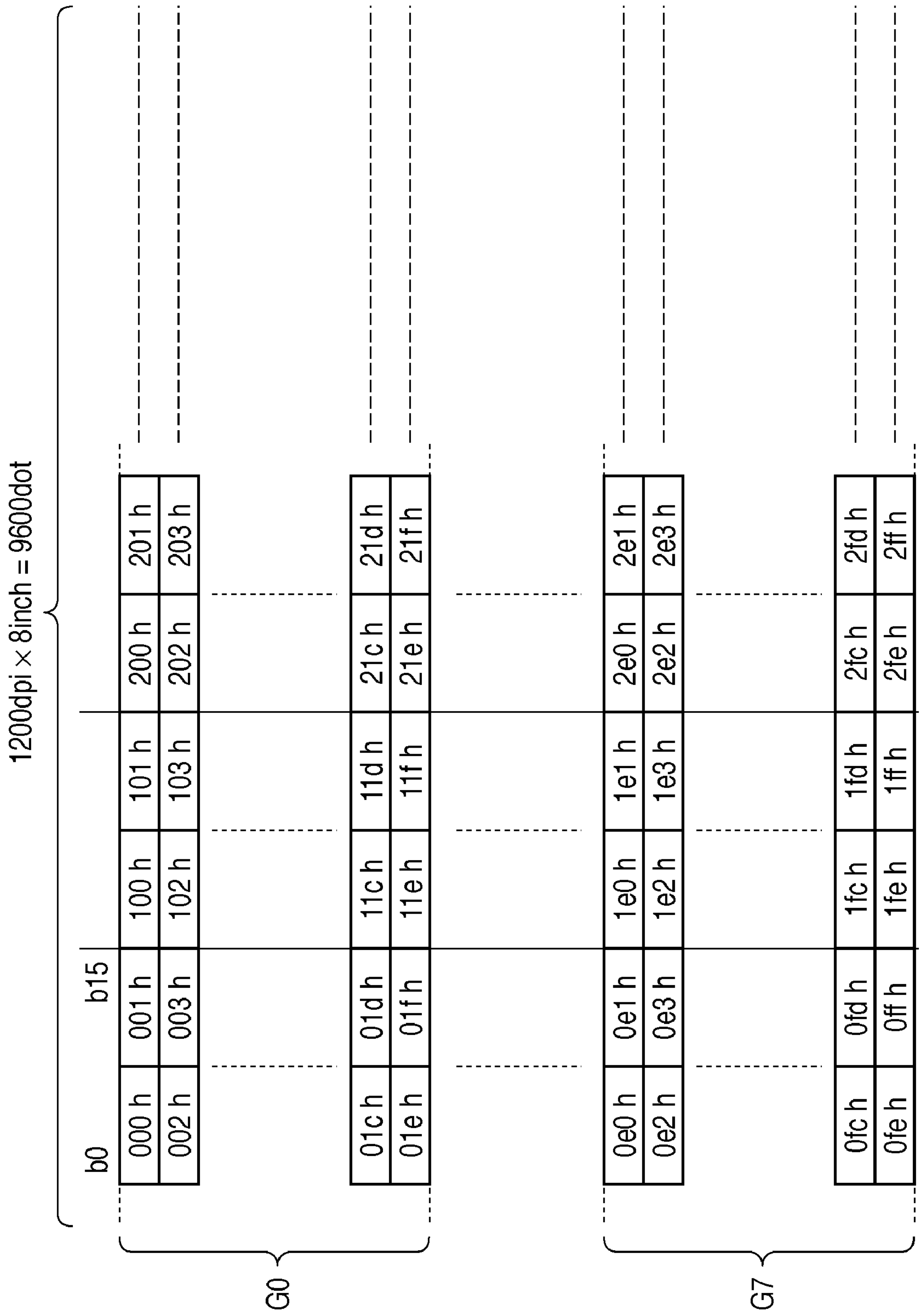
FIG. 9 is a view of a data arrangement in a printing buffer.

FIG. 9 is a view schematically showing the arrangement of image data in the printing buffer 204.

Storage positions in the printing buffer 204 are memory areas defined by addresses 000 to 0fe corresponding to 128 printing elements in the vertical direction, and addresses corresponding in number to the product of the resolution and printing medium size in the horizontal direction. As represented by "h" in FIG. 9, this address is based on the hexadecimal representation. When the resolution is 1,200 dpi and the printing medium size is 8 inch, the printing buffer 204 has memory areas capable of storing data of 9,600 dots.

b0 at address 000 in FIG. 9 holds printing data corresponding to a printing element of nozzle number 0. b1 adjacent to b0 at address 000 holds printing data of nozzle number 0 to be printed in the next column. As the memory area shifts in the horizontal direction, printing data to be printed in the next column is held. Similarly, at address 0fe, printing data corresponding to a printing element of nozzle number 127 is held.

In this manner, printing data corresponding to a printing element of the same nozzle number are held at each address of the printing buffer 204. In practice, the first column is printed based on printing data in b0 at addresses 000 to 0fe, and the second column is printed based on printing data in b1 at addresses 000 to 0fe. The H-V converter 205 H-V-converts printing data stored in the printing buffer 204 in the raster direction, and the converted printing data is stored in the nozzle buffer 211 in the column direction.

Figure 21:
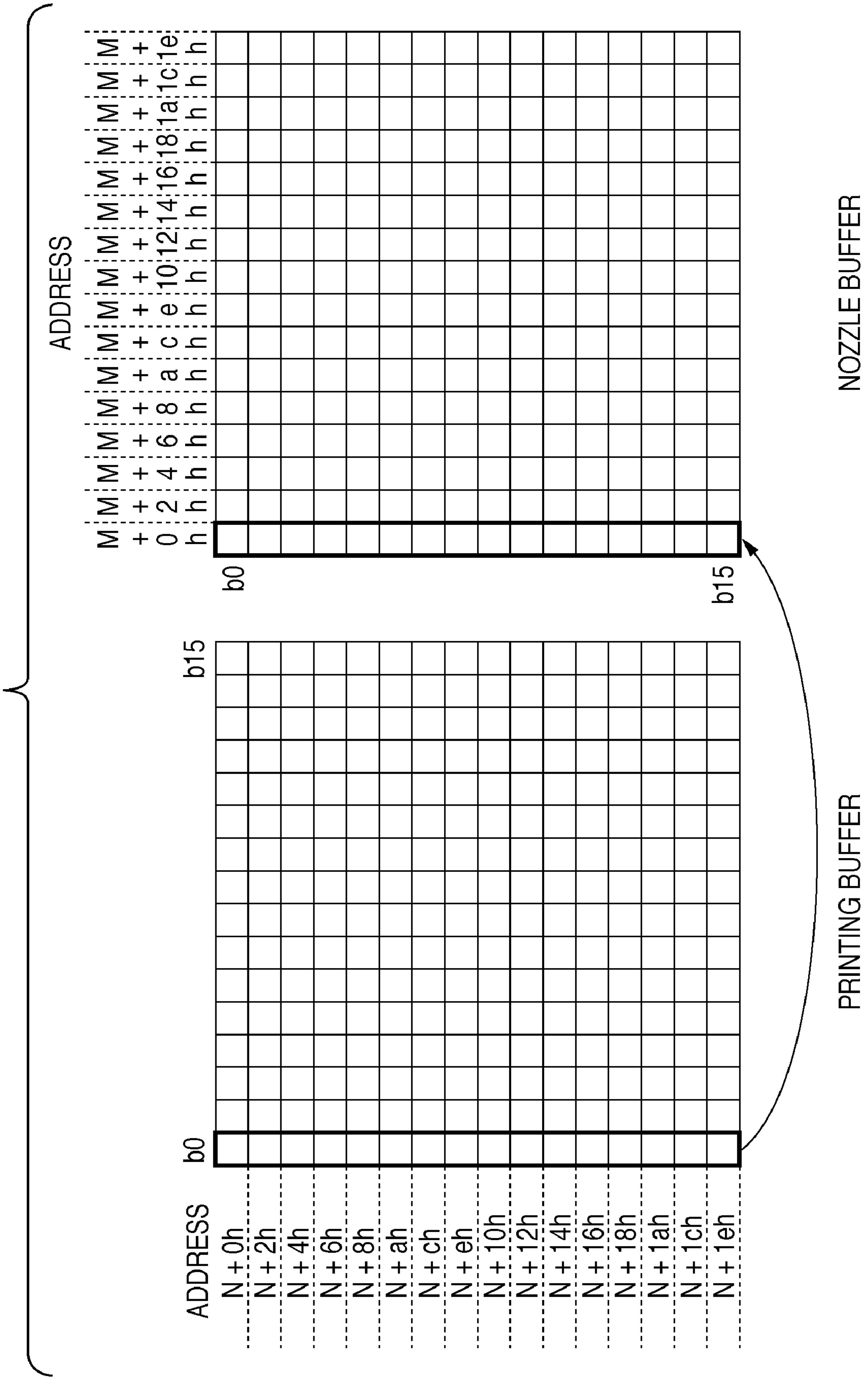
FIG. 21 is a view showing an H-V conversion operation.

FIG. 21 shows the operation of H-V conversion. H-V conversion is executed in unit of 16 bit×16 bit data. Data in b0 at addresses N+0 to N+1E in the printing buffer 204 are written at address M+0 in the nozzle buffer 211. Then, data in b1 at addresses N+0 to N+1E in the printing buffer 204 are written at address M+2 in the nozzle buffer 211. Subsequently, the same processing is performed. The read-out operation and write-in operation are repeated 16 times, thereby achieving one H-V conversion. H-V conversion is performed for each group sequentially from groups 0 (G0) to 7 (G7).

FIG. 22 is a view showing the internal configuration of the nozzle buffer. Since H-V conversion is performed during the printing operation, the nozzle buffer has two banks as shown in FIG. 22 so that the write-in operation in the nozzle buffer and the read-out operation become exclusive to each other. One bank has an area capable of storing data of 16 columns. While write-in is made in bank 0, read-out is made from bank 1; while write-in is made in bank 1, read-out is made from bank 0.

Figure 8:
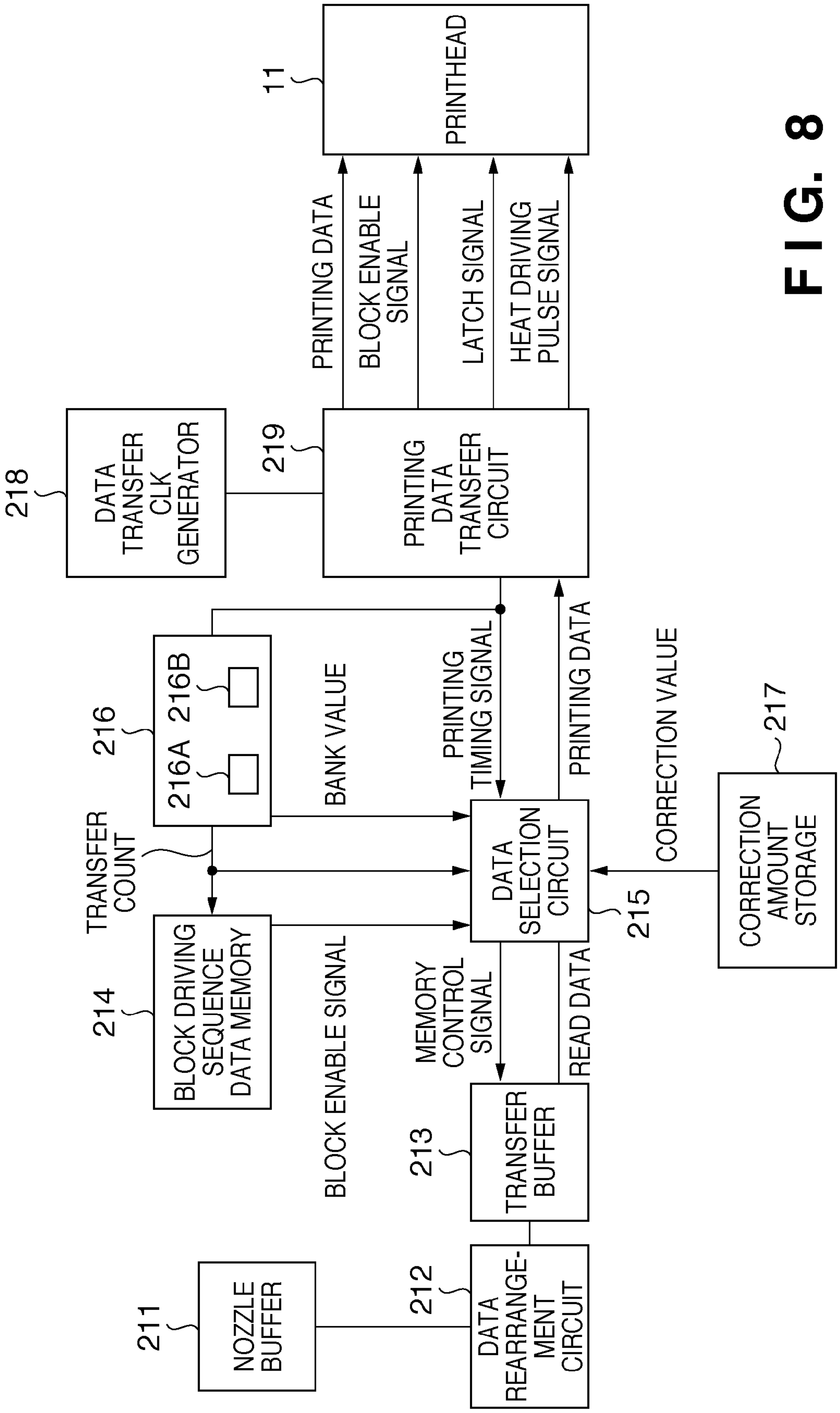
FIG. 8 is a block diagram showing the internal arrangement of an ASIC.

A configuration for time-divisionally driving printing elements will be explained with reference to the internal block diagram of the ASIC 206 shown in FIG. 8.

Figure 23:
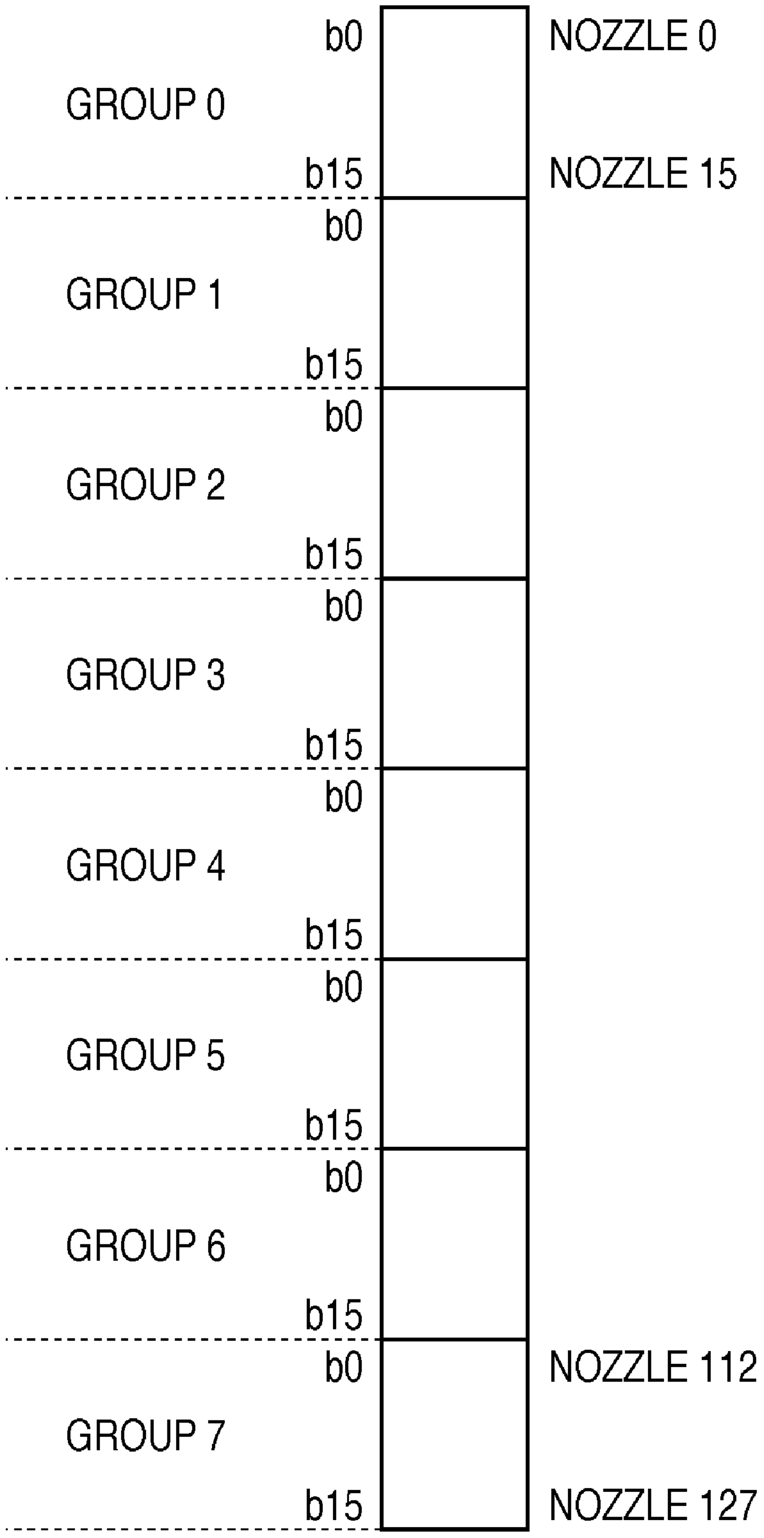
FIG. 23 is a view of a data arrangement in the nozzle buffer.

A data rearrangement circuit 212 is a printing data rearrangement circuit which writes printing data held by the nozzle buffer 211 shown in FIG. 23 at once in a transfer buffer 213 as printing data to be simultaneously printed for each block number. As to data stored in the transfer buffer, data corresponding to nozzles of the same block number are stored at the same address.

The transfer buffer is, e.g., an SRAM.

FIG. 24 is a view showing the configuration of the transfer buffer 213. Bank 0 will be exemplified. Printing data of blocks 0 to 15 are sequentially held at addresses Ad00 to Ad0f. Block 0 holds printing data b0 for groups 0 (G0) to 7 (G7), and block 1 holds printing data b1 for groups 0 to 7. In the same way, printing data are sequentially held at addresses Ad10 to Ad1f of bank 1 and addresses Ad20 to Ad2f of bank 2.

The transfer buffer 213 has three banks each for printing data of 16 blocks, as shown in FIG. 24, so that the write-in operation and read-out operation become exclusive to each other. While write-in is made in bank 0, read-out is made from banks 1 and 2; while write-in is made in bank 1, read-out is made from banks 2 and 0; while write-in is made in bank 2, read-out is made from banks 0 and 1. Each bank holds printing data corresponding to one column of the printing element array, so the transfer buffer 213 holds printing data of three columns of the printing element array. Read-in uses two banks to read printing data of two columns of the printing element array. In other words, a plurality of areas (banks) smaller in number than column data areas (banks) are selected from the transfer buffer having the column data areas (banks), each of which holds printing data corresponding to one column of the printing element array. Then, data of each column is read out from the selected bank(s). The reason of this operation will be explained later.

Referring back to FIG. 8, a counter 216 has two counters. One is a block counter 216A which is a counter circuit for counting image data transfer operations and is incremented every printing timing signal. The block counter 216A counts from 0 to 15, and then returns to 0. The block counter 216A counts the bank value of the transfer buffer. When the block counter 216A counts 16 times, the bank value is incremented by one, and when the bank value reaches a maximum one, returns to 0. The other counter is an accumulation counter 216B which counts the accumulation (total) of printing data transfer operations.

In a block driving sequence data memory 214, the sequence of sequentially driving 16-divided printing elements of block numbers 0 to 15 is recorded at addresses 0 to 15. When sequentially driving printing elements from block 0, the sequence of 0→1→2 . . . is stored. The printing element driving sequence is read out from the block driving sequence data memory 214, based on the transfer count obtained by the block counter 216A. In forward printing, the printing element driving sequence of address 0→1→2 . . . is read out. In backward printing, the printing element driving sequence of address 15→14→13 . . . is read out.

A printing data transfer circuit 219 increments the block counter 216A when triggered by a printing timing signal generated based on, e.g., an optical linear encoder. The output timing of the printing timing signal is synchronized with that of a latch signal. A data selection circuit 215 reads out the value of the block driving sequence data memory 214 and printing data corresponding to the bank value from the transfer buffer 213 in response to the printing timing signal. Printing data corrected by a correction amount held by a correction amount storage 217 is transferred to the printhead 11 in synchronism with a data transfer CLK signal HD_CLK generated by a data transfer CLK generator 218. For this transfer, the printing data transfer circuit 219 comprises a shift register which operates in synchronism with HD_CLK.

FIG. 10 shows an example of block driving sequence data written at addresses 0 to 15 in the block driving sequence data memory 214. In FIG. 10, block data representing blocks 0 and 1 are stored at addresses 0 and 1 in the block driving sequence data memory 214. Similarly, block data representing blocks 2 to 15 are sequentially stored at addresses 2 to 15.

When triggered by the printing timing signal, the data selection circuit 215 reads out block data 0000 (numerical value representing block 0) as a block enable signal from address 0 in the block driving sequence data memory 214. The data selection circuit 215 reads out printing data corresponding to block data 0000 from the transfer buffer 213, and transfers it to the printhead 11 via the printing data transfer circuit 219.

Similarly, in response to the next printing timing signal, the data selection circuit 215 reads out block data 0001 (numerical value representing block 1) as a block enable signal from address 1 in the block driving sequence data memory 214. The data selection circuit 215 reads out printing data corresponding to block data 0001 from the transfer buffer 213, and transfers it to the printhead 11.

When triggered by subsequent printing timing signals, the data selection circuit 215 sequentially reads out block data from addresses 2 to 15 in the block driving sequence data memory 214. The data selection circuit 215 reads out printing data corresponding to the respective block data from the transfer buffer 213, and transfers them to the printhead 11.

In this way, the printing data transfer circuit 219 reads out block data set at addresses 0 to 15 in the block driving sequence data memory 214. Printing data corresponding to the respective block data are read out from the transfer buffer 213 and transferred to the printhead 11, thereby printing one column. That is, when 16 printing timing signals are output, block data of one column are read out from the transfer buffer 213.

Figure 11:
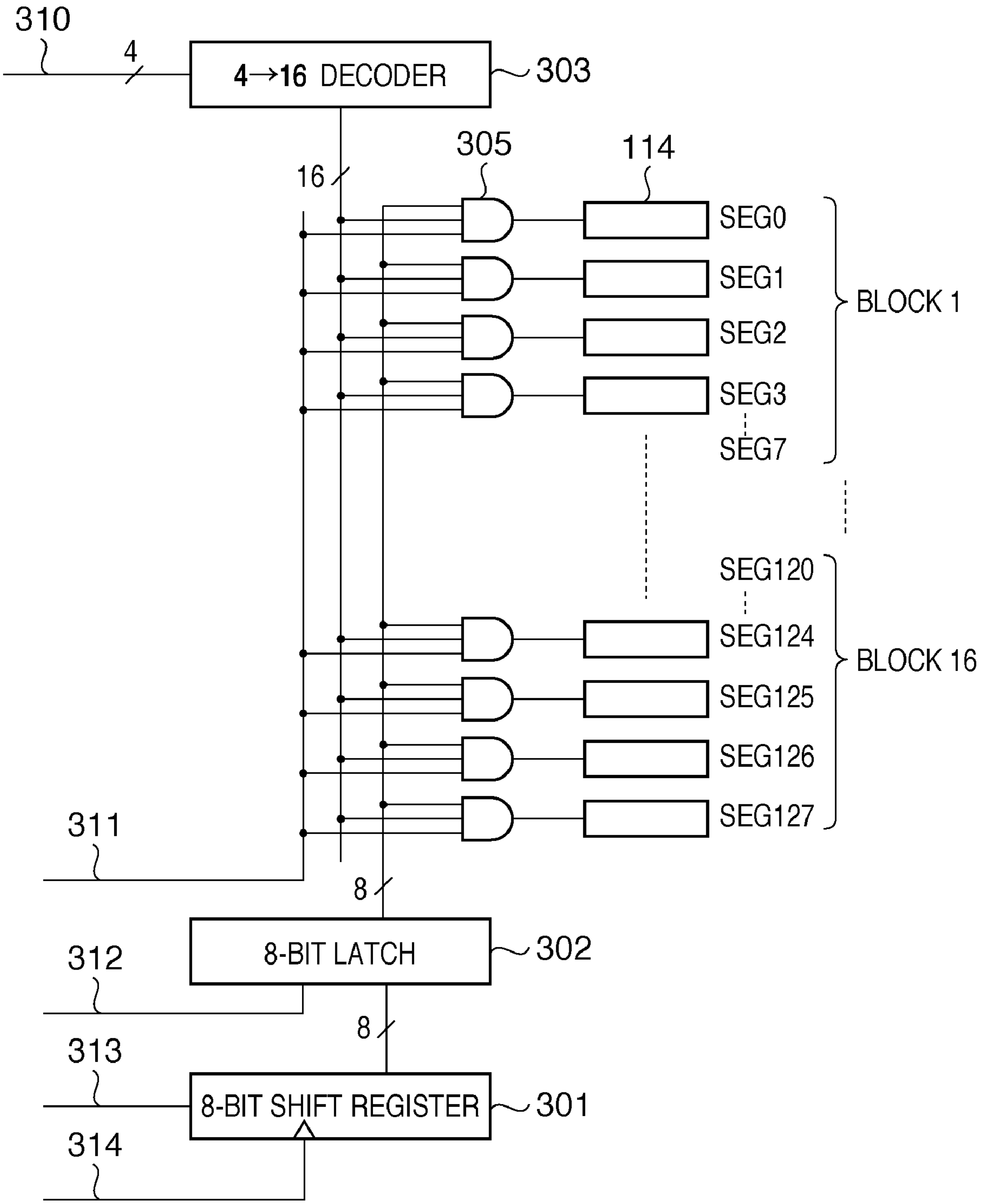
FIG. 11 is a block diagram showing the driving circuit of the printhead.

FIG. 11 shows a driving circuit arranged in the printhead 11. The driving circuit divides 128 printing elements 114 into 16 blocks and drives them, thereby driving eight printing elements belonging to the same block. The driving circuit receives data and signals from the printing data transfer circuit 219 shown in FIG. 8. Printing data 313 is serially transferred to the printhead 11 by an HD_CLK signal 314. The printing data 313 is input to an 8-bit shift register 301, and latched by an 8-bit latch 302 in synchronism with the leading edge of a latch signal 312. In block designation, the printing elements 114 of a block designated by a decoder 303 are selected by a 4-bit block enable signal 310.

Only printing elements 114 designated by both the block enable signal 310 and printing data 313 are driven by a heater driving pulse signal 311 output from an AND gate 305, and discharge ink droplets to print.

Figure 12:
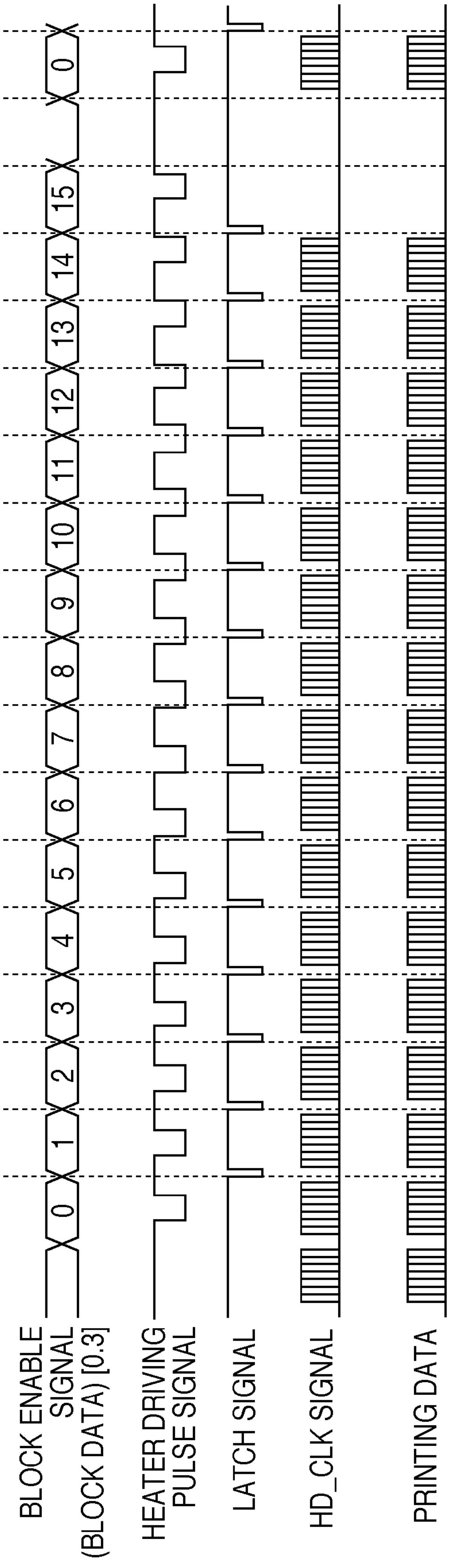
FIG. 12 is a driving timing chart of a block driving signal.

FIG. 12 shows the driving timing of the block enable signal 310. The divided block selection circuit can generate the block enable signal 310, based on block driving sequence data stored in the block driving sequence data memory 214.

As represented by the block enable signal 310 in FIG. 12, the divided block selection circuit is set to sequentially designate 16 blocks 0 to 15 in accordance with a block driving sequence generated from the block driving sequence data memory 214. In unidirectional printing, and backward printing of reciprocal printing, the block enable signal 310 representing the driving timing drives blocks in the driving sequence of block 0→1→2→3→4→5→6→7→8→9→10→11→12→13→14→15. The block enable signal 310 is generated to designate respective blocks at the timings of equal intervals in one cycle.

[Creation of Test Pattern]

An outline of slanting displacement correction in the inkjet printing apparatus of the embodiment will be described. A feature of the inkjet printing apparatus of the embodiment is to correct the slanting displacement of a dot. Although information (slant information) on slanting displacement can be detected by any method, an example of obtaining information on slanting displacement by using an optical sensor will be explained.

Figure 13:
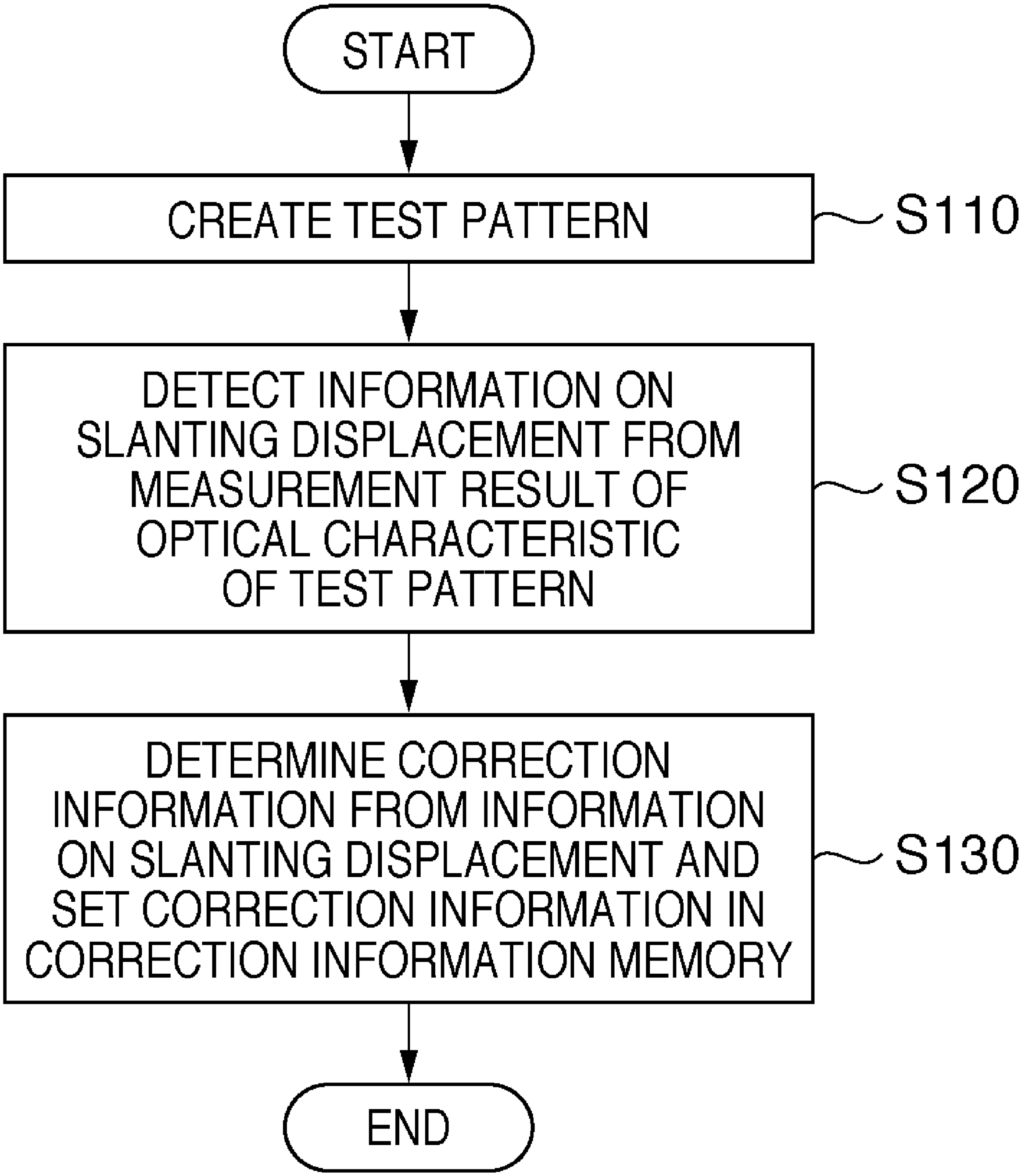
FIG. 13 is a flowchart showing an outline of detecting the slanting displacement value of a dot.

FIG. 13 is a flowchart showing an outline of detecting the slanting displacement value of a dot.

In step S110, a test pattern is created. The test pattern is created by printing a plurality of test patches on a printing medium at different discharge timings. In step S120, the optical characteristic of each test patch is measured using an optical sensor, and information on slanting displacement is detected. In the embodiment, the reflectance optical density of the test patch is measured as the optical characteristic. In step S130, correction information is determined from the detected information on slanting displacement, and set in the correction amount storage 217.

Creation of a test pattern in step S110 and detection of information on slanting displacement by measurement of the optical characteristic in step S120 will be described. In this example, the displacement amount of dots in the main scanning direction that are formed by three ink orifices 13 on each of the upstream and downstream sides in the sub-scanning direction corresponding to the two ends of the ink orifice array 141 are detected as information on slanting displacement.

Figure 14:
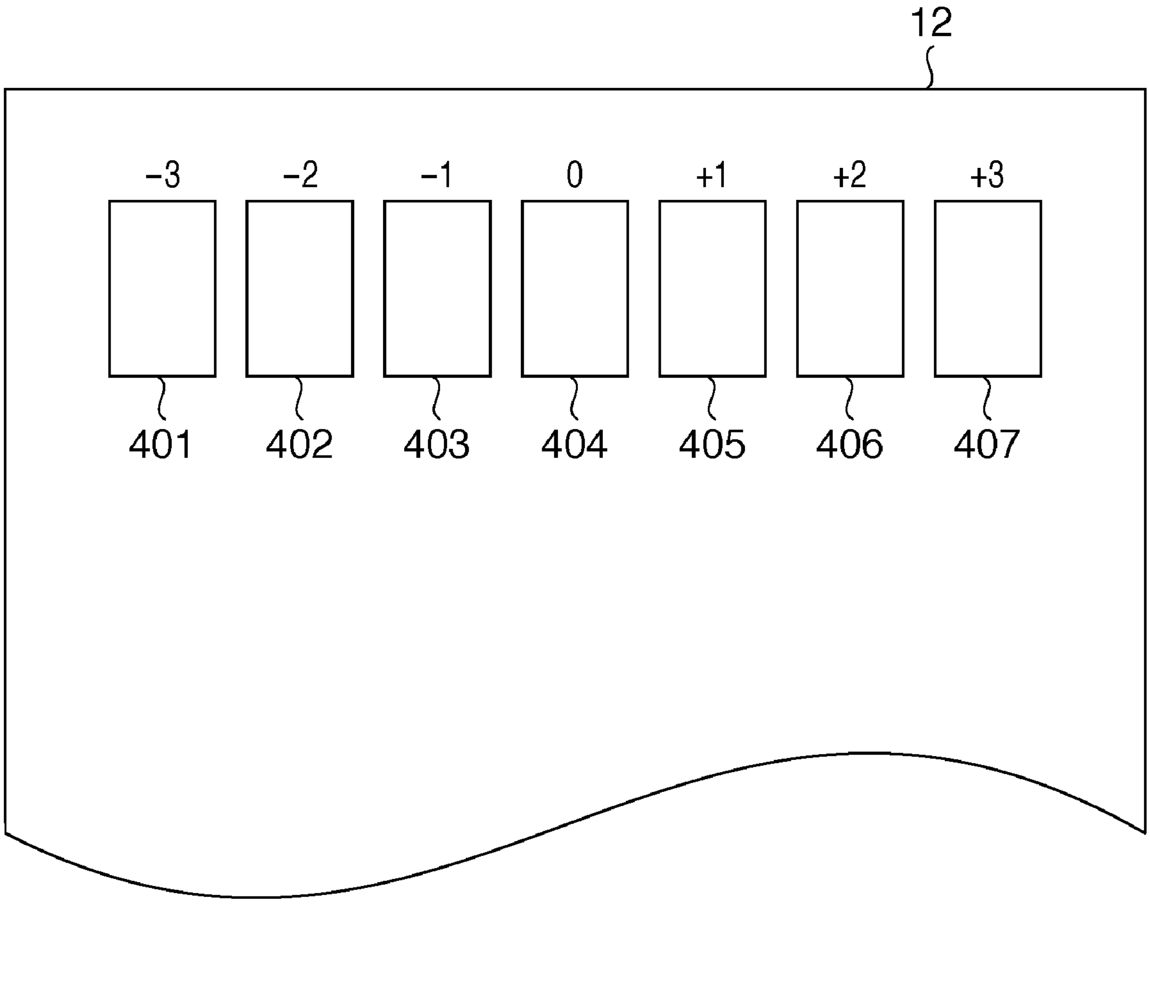
FIG. 14 is a view of a slanting displacement detection pattern.

FIG. 14 shows a test pattern formed on the printing medium 12 in step S110. The test pattern is made up of seven test patches 401 to 407. Each test patch is formed as follows. First, images each formed from dots of four successive columns are printed at intervals of four columns by using three ink orifices 13 on the upstream side in the sub-scanning direction. Then, the printing medium 12 is conveyed, and images each formed from dots of four successive columns are printed at the intervals of four columns by using three ink orifices on the downstream side. In this case, printing is performed by discharging ink from three ink orifices on each of the upstream and downstream sides in the sub-scanning direction while moving the printhead from left to right in FIG. 14 (unidirectional printing).

The test patch 404 is formed by discharging ink from three ink orifices on the downstream side in the sub-scanning direction at a timing assumed to fill the interval of four columns. The test patches 405, 406, and 407 are created by delaying the driving timing of the ink orifices 13 on the downstream side to shift images formed by the ink orifices on the downstream side to the right in FIG. 14 by a ½ pixel, one pixel, and 3/2 pixel from the intervals of four columns. The test patches 403, 402, and 401 are created by quickening the driving timings of the ink orifices 13 on the downstream side to shift images formed by the ink orifices on the downstream side to the left in FIG. 14 by a ½ pixel, one pixel, and 3/2 pixel from the intervals of four columns.

[Detection of Slanting (Displacement) Using Test Pattern]

Figure 15A:
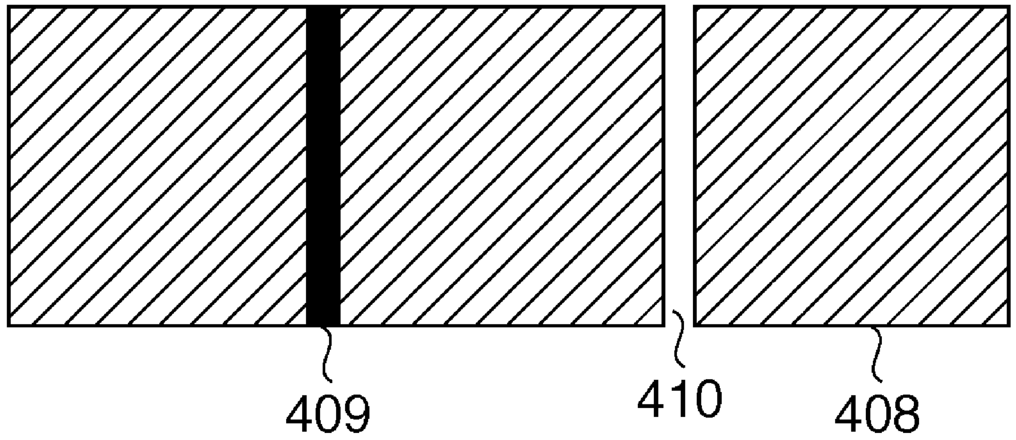
FIGS. 15A and 15B are views of a slanting displacement detection test patch.
Figure 15B:
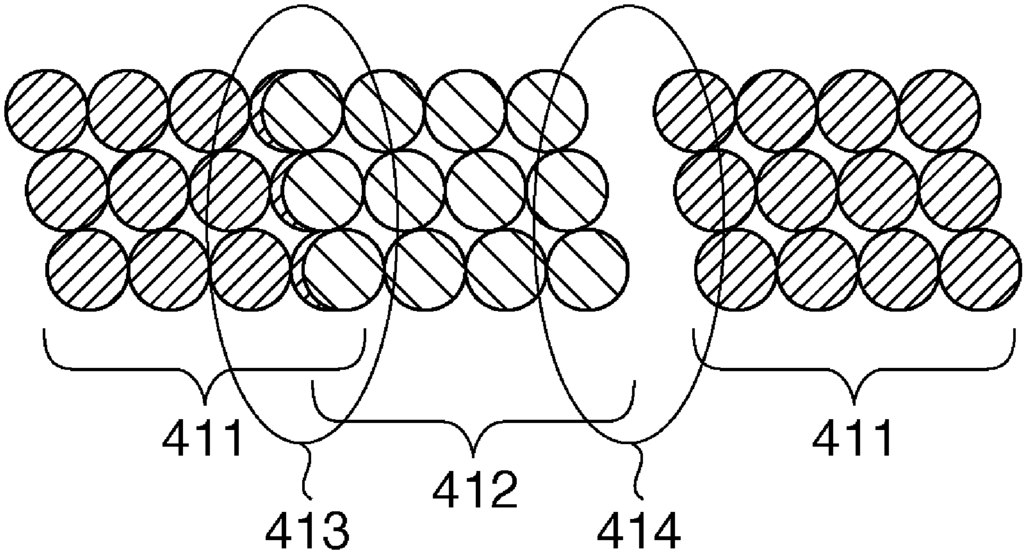
Figure 16:
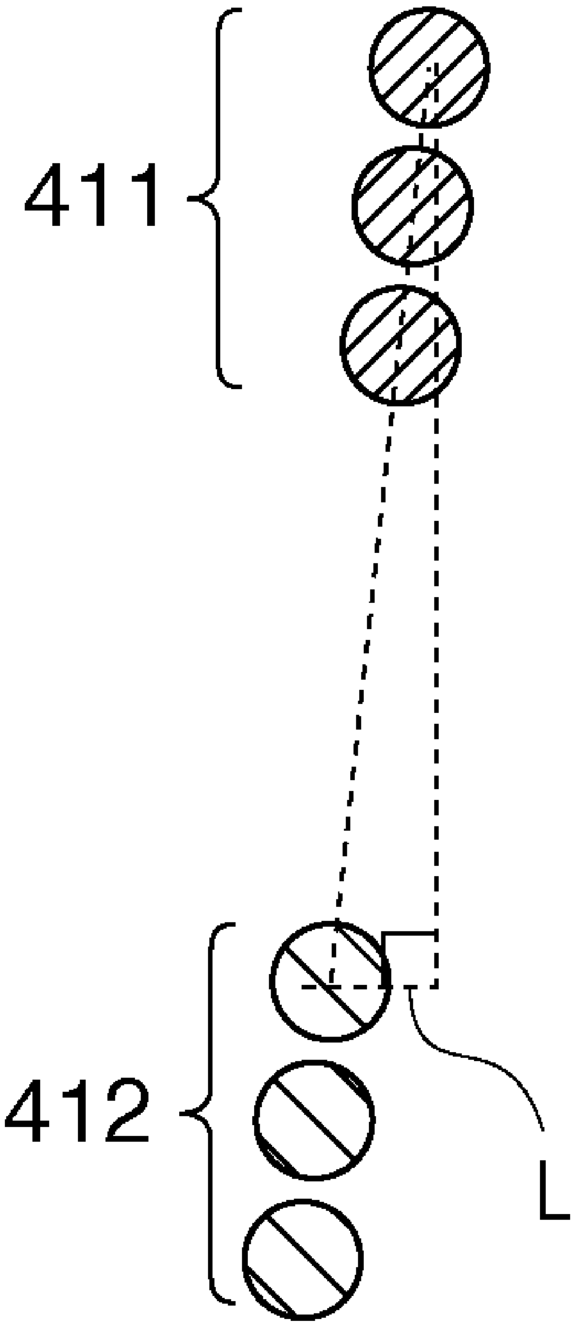
FIG. 16 is a view of a dot arrangement when slanting displacement occurs.

A method of detecting, from a created test pattern, the displacement amount of dots in the main scanning direction that are formed by three ink orifices 13 on each of the upstream and downstream sides will be explained. FIGS. 15A and 15B are views showing an image 408 of the test patch 404 and a dot arrangement when slanting displacement exists. In the image 408 of the test patch 404, a dot-overlapped portion and dot-free portion appear as a black stripe 409 and white stripe 410 in accordance with the slanting displacement. In a case where there is slanting displacement, a displacement L in the main scanning direction exists between dots 411 on the upstream side in the subscanning direction and dots 412 on the downstream side in the subscanning direction, as shown in FIG. 16. The test patch 404 is an image printed by the ink orifices 13 on the downstream side at a timing assumed to fill the interval of four columns after an image is printed by the ink orifices 13 on the upstream side. For this reason, the dot-overlapped portion and dot-free portion of the dots 411 on the upstream side and the dots 412 on the downstream side occur, as represented by a dot-overlapped portion 413 and dot-free portion 414 in FIG. 15B. This results in the image 408 having the black stripe 409 and white stripe 410 as shown in FIG. 15A. In this fashion, occurrence of slanting displacement can be detected from the image 408 of the test patch 404.

Figure 17A:
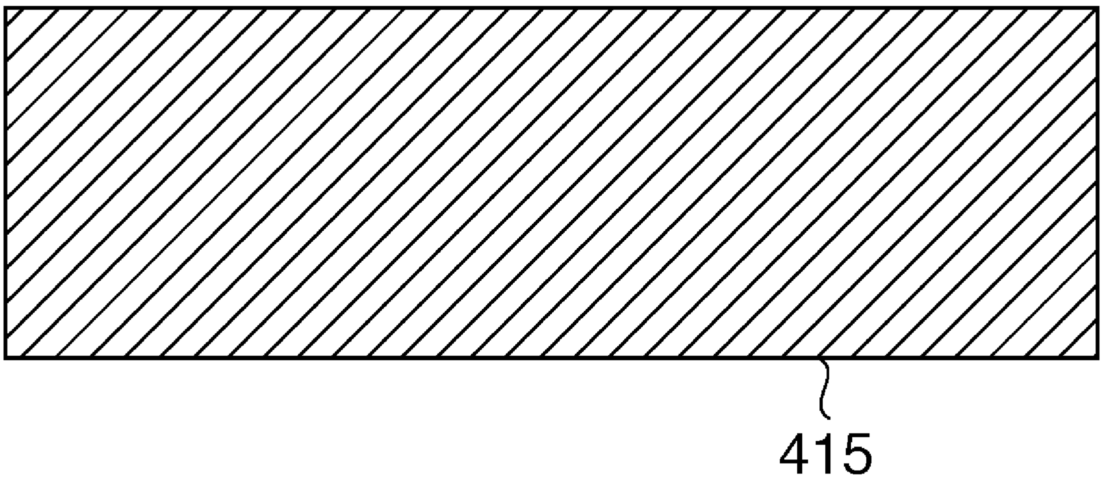
FIGS. 17A and 17B are views of a slanting displacement detection test patch.
Figure 17B:
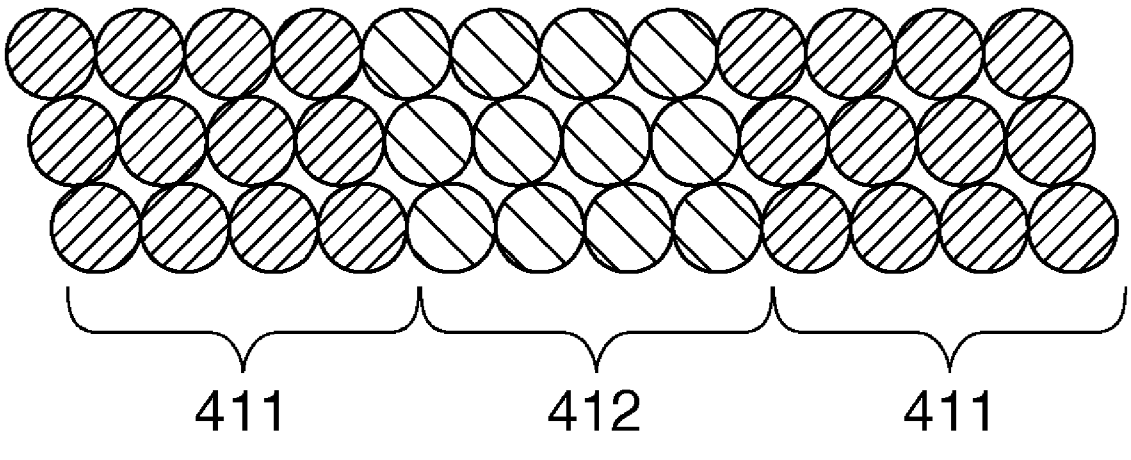

Detection of the displacement amount in the main scanning direction when slanting displacement exists will be described. In the following description, assume that the test patch 406 of the seven test patches is an image 415 of a uniform print density free from any black or white stripe, as shown in FIG. 17A. FIG. 17B shows details of the dot arrangement of the image 415.

In the test patch 406, the dots 412 on the downstream side are formed by delaying the driving timing of ink orifices on the downstream side to shift the dots 412 on the downstream side by one pixel in the main scanning direction from the interval of four columns. If no slanting displacement exists, black and white stripes appear at the intervals of four columns. However, the displacement L in the main scanning direction occurs between the dots 411 on the upstream side and the dots 412 on the downstream side, as shown in FIG. 16. This displacement cancels displacement occurred when delaying the driving timing of the ink orifices 13 on the downstream side. Thus, the test patch 406 has the image 415 of a uniform print density. In this manner, it can be detected that a clockwise slanting displacement occurs with a dot displacement amount of one pixel in the main scanning direction between the dots 411 on the upstream side and the dots 412 on the downstream side.

The dot displacement amount in the main scanning direction as information on slanting displacement can be detected by selecting an image of a uniform print density from test patches created by changing the driving timing of ink orifices on the downstream side.

In step S120, the reflectance optical densities of the seven test patches are measured using an optical sensor. By selecting a test patch having high reflectance optical density from the measurement results, a test patch in which dots are uniformly arranged without any black or white stripe can be detected.

A slanting displacement correction method when the test patch 406 is detected as a uniform image, i.e., when a clockwise slanting displacement occurs and dots formed by upstream and downstream printing elements deviate from each other by one pixel in the main scanning direction will be described.

[Slanting (Displacement) Correction]

FIG. 18 shows correction value information (slant information) held in the correction amount storage 217 which stores slant information. The correction amount storage 217 holds information (slant correction amount) as to how many printing timing signals in 16-divisional driving is delayed for correction. A setting value of 0 is set for group 0 not to correct the slope. A setting value of 2 is set for group 1 to correct the slant by two printing timing signals. A setting value of 4 is set for group 2 to correct the slant by four printing timing signals. A setting value of 6 is set for group 3 to correct the slant by six printing timing signals. Setting values of 8, 10, 12, and 14 are set for groups 4, 5, 6, and 7.

In the embodiment, a correction value of 0 is set for group 0 serving as a reference, but the reference group is arbitrary. For example, group 7 is defined as a reference, and setting values of 2, 4, 6, 8, 10, 12 and 14 are set for groups 6, 5, 4, 3, 2, 1, and 0, respectively. In contrast to correction using group 0 as a reference, the printing timing signal may also be quickened in correspondence with the setting value.

A in FIG. 1 represents nozzle numbers NZL, selection blocks SBK, and printing data DATA assigned to printing elements of groups 0 (G0) to 7 (G7). B in FIG. 1 represents the arrangement of dots printed on a printing medium in correspondence with A in FIG. 1. The printing data is data just transferred to the printhead. For easy understanding of correction, A in FIG. 1 assumes that the nozzle array does not slant. "○" represents a dot printed based on printing data. The printing data in FIG. 1 is based on printing data stored in the transfer buffer 213, and is selected in accordance with the slant and transferred to the printhead. The dot arrangement schematically represents dots formed on a printing medium when no slanting displacement exists and printing is executed, based on printing data stored in the transfer buffer 213.

In FIG. 1, the printing position is shifted in correspondence with a number designated by correction information sequentially from a printing element whose discharge turn is early in each group. This will be explained with reference to B of FIG. 1. For example, the value of correction information of group 0 is 0. All dots are arranged in the first column in a dot arrangement corresponding to nozzles belonging to group 0, and dots are arranged in the first to third columns. The value of correction information of group 1 is 2. Positions corresponding to nozzle number 16 (selection block 0) and nozzle number 17 (selection block 1) are blank in a dot arrangement corresponding to nozzles belonging to group 1. Dots are arranged from a position corresponding to nozzle number 18. In the fourth column, dots are arranged at positions corresponding to nozzle numbers 16 and 17. The value of correction information of group 2 is 4. Positions corresponding to nozzle numbers 32 to 35 are blank in a dot arrangement corresponding to nozzles belonging to group 2. Dots are arranged from a position corresponding to nozzle number 36. In the fourth column, dots are arranged at positions corresponding to nozzle numbers 32 to 35. In this fashion, the printing timing is delayed, based on correction information.

Figure 27:
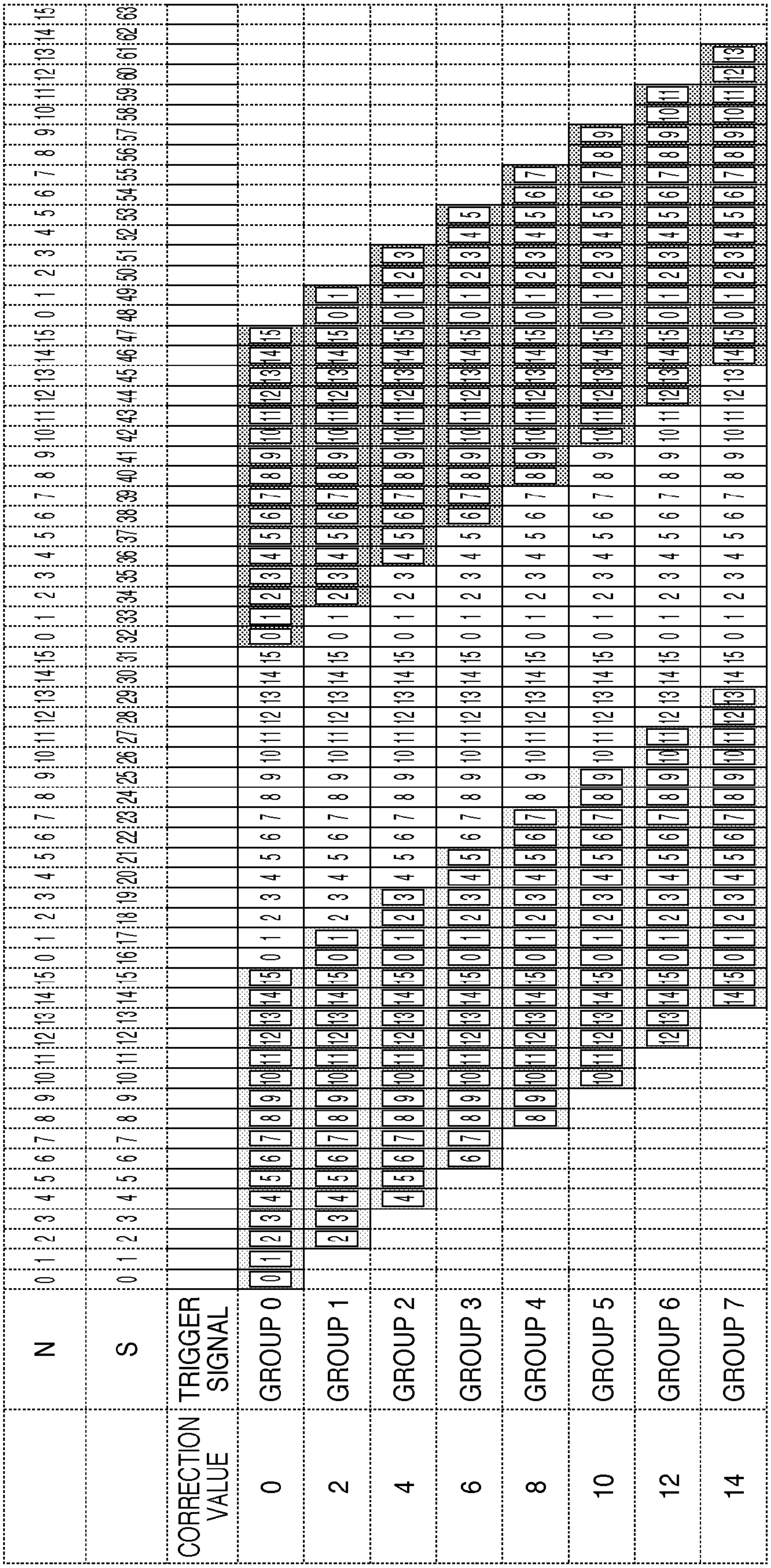
FIG. 27 is a view showing the printing data read timing in the first embodiment.

FIG. 27 is a view showing the timing for reading out printing data from the transfer buffer 213. The time elapses from left to right in FIG. 27.

N is the count value of the block counter 216A, and is updated within the range of 0 to 15. The N value is 0 in the first read and 1 in the second read. S is the count value of the accumulation counter 216B, and represents the accumulation (total) of read operations. The S value is set to 0 at the start of print scanning.

A number described for each trigger signal (latch signal) in groups 0 to 7 represents a block number transferred (read out) at the timing of the trigger signal. For example, when the first trigger signal is output (S=0, N=0) in FIG. 27, the number corresponding to group 0 is 0. The number "0" corresponds to "0" in the column of selection blocks belonging to group 0 in A of FIG. 1, and corresponds to "○" in the first column in B of FIG. 1.

An area shaded in light gray represents printing data printed in the first column, an unshaded area represents printing data printed in the second column, and an area shaded in thick gray represents printing data printed in the third column. The correction value of each group is 0 for group 0, 2 for group 1, 4 for group 2, 6 for group 3, 8 for group 4, 10 for group 5, 12 for group 6, and 14 for group 7. As the group number increases, the correction value increases. FIG. 27 shows that the read start timing is further delayed for a larger group number.

A means for generating corrected printing data will be described.

The data selection circuit 215 comprises a latch means for latching printing data read out from the transfer buffer. The data selection circuit 215 reads out printing data from the transfer buffer, based on information counted by the counter 216 (e.g., the accumulation counter 216B). This read-out processing may also be performed based on the value of the block counter 216A or performed using the two counters. The data selection circuit 215 reads out printing data from banks 0 and 2 of the transfer buffer 213 shown in FIG. 24 at the timings of accumulation counts of 0 to 15. The data selection circuit 215 reads out printing data from banks 1 and 0 at the timings of accumulation counts of 16 to 31. The data selection circuit 215 reads out printing data from banks 2 and 1 at the timings of accumulation counts of 32 to 47. The data selection circuit 215 reads out printing data from banks 1 and 0 at the timings of accumulation counts of 48 to 63.

For example, at an accumulation count of 0, printing data of block 0 are read out from block 0 of bank 0 and block 0 of bank 2. That is, printing data stored at address 0 (Ad00h) and printing data stored at address 20 (Ad20h) are read out. At an accumulation count of 1, printing data are read out from block 1 of bank 0 and block 1 of bank 2. Printing data of blocks 2 to 15 are sequentially read out.

At an accumulation count of 16, printing data are read out from block 0 of bank 0 and block 0 of bank 1. At an accumulation count of 17, printing data are read out from block 1 of bank 0 and block 1 of bank 1. Printing data of blocks 2 to 15 are sequentially read out.

At an accumulation count of 22, printing data are read out from block 6 of bank 0 and block 6 of bank 1. Printing data at addresses 16 and 6 are read out as printing data of block 6.

Figure 28:
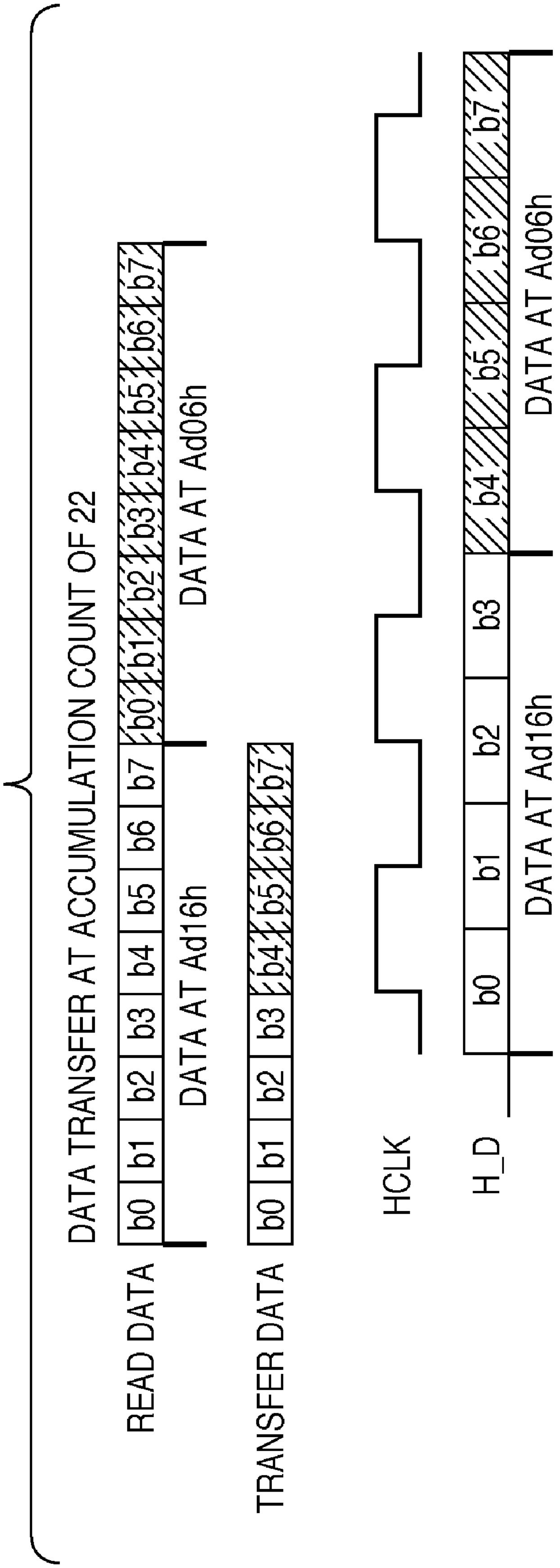
FIG. 28 is a schematic view of generation of data at the timing of an accumulation count of 22 in the first embodiment.

FIG. 28 is a schematic view of generation of transfer data at the timing of an accumulation count of 22. Transfer data b0 is printing data for printing elements of group 0. Since the transfer block is block 6, transfer data b0 is printing data for block 6 of group 0, i.e., printing data for seg 6 of the printhead 11. Also, transfer data b7 is printing data for block 6 of group 7, i.e., printing data for seg 118 of the printhead 11.

Figure 25:
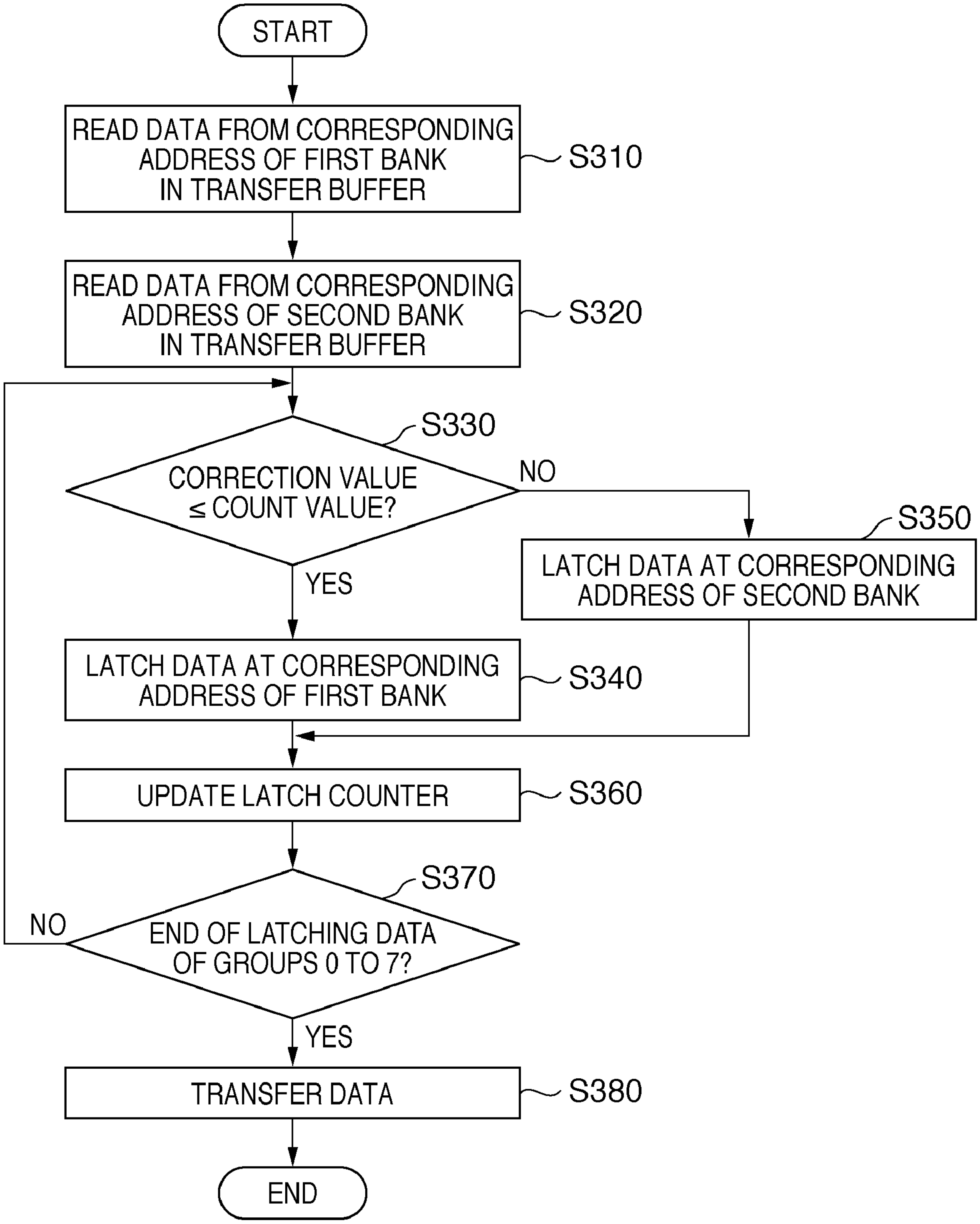
FIG. 25 is a flowchart of selection of printing data.

FIG. 25 is a flowchart of selection of printing data by the data selection circuit 215. A method of generating transfer data at a timing when the value of the block counter 216A is 6 and the value of the accumulation counter is 22 will be described with reference to this flowchart. The data selection circuit 215 comprises one comparator for comparing the correction value with the value of the block counter 216A.

After the printing timing signal is input, printing data is read out from address 16 of bank 1 serving as the first bank in the transfer buffer 213, and temporarily latched by the first latch means (not shown) (step S310). Subsequently, printing data is read out from address 6 of bank 0 serving as the second bank in the transfer buffer 213, and temporarily latched by the second latch means (not shown) (step S320).

The correction value of group 0 is compared with the count value of the block counter 216A (step S330). The condition of the correction value≦count value is satisfied as a result of comparing the correction value "0" of group 0 with the count value "6" of the block counter 216A. Hence, printing data b0 at address 16 is selected and latched by the third latch means (not shown) (step S340). Then, the latch counter is updated (step S360). It is determined whether or not printing data of all groups have been latched (step S370). In this case, since printing data of group 0 have been latched, the process returns to step S330.

The same processing as that for group 0 is executed for group 1. Since the correction value of group 1 is 2 and the count value is 6, the condition of the correction value≦count value is satisfied. Thus, printing data b1 at address 16 is selected and latched by the third latch means (not shown) (step S340). The latch counter is updated every time the third latch means latches printing data b0 to b7 in step S340 or S350 (step S360).

The same processing is repeated up to group 7. Upon completion of processing of groups 0 to 7, data latched by the third latch means are transferred to the printhead 11 in step S380.

As for group 4, the correction value is 8 and the count value of the block counter 216A is 6, so the condition of the correction value≦count value is not satisfied. The determination in step S330 is made, and the process advances to step S350 to latch printing data b4 at address 6 by the third latch means (step S350). Since the condition of the correction value≦count value is not satisfied for groups 5 to 7, printing data b5, b6, and b7 at address 6 are latched by the third latch means. As a result, transfer data b0 to b7 are generated.

The above-described processing will be summarized. As shown in FIG. 28, transfer data b0 to b3 are formed from data held at address 16, and transfer data b4 to b7 are formed from data held at address 6.

Note that the latch counter which counts the number of printing data b0 to b7 latched by the third latch means clears the count to 0 after counting eight times in correspondence with groups 0 to 7.

As described above, data to be transferred to the printing data transfer circuit 219 is generated based on the value of the block counter 216A, the value of correction information, and data read out from the transfer buffer.

The data selection circuit 215 may also employ another configuration. For example, the data selection circuit 215 may also comprise comparators corresponding in number to the number of blocks, and a readout circuit for reading out data of each block from two banks. With this configuration, the data selection circuit 215 parallel-generates data of all blocks.

As shown in FIG. 28, transfer data b0 to b3 of groups 0 to 3 are printing data of the second column that should be originally printed at an accumulation count of 22. Transfer data b4 to b7 of groups 4 to 7 are printing data of the first column that should be printed at a preceding timing. The generated transfer data are transmitted to the printhead 11 by the printing data transfer circuit 219 together with a HCLK signal generated by the data transfer CLK generator 218.

Figure 29:
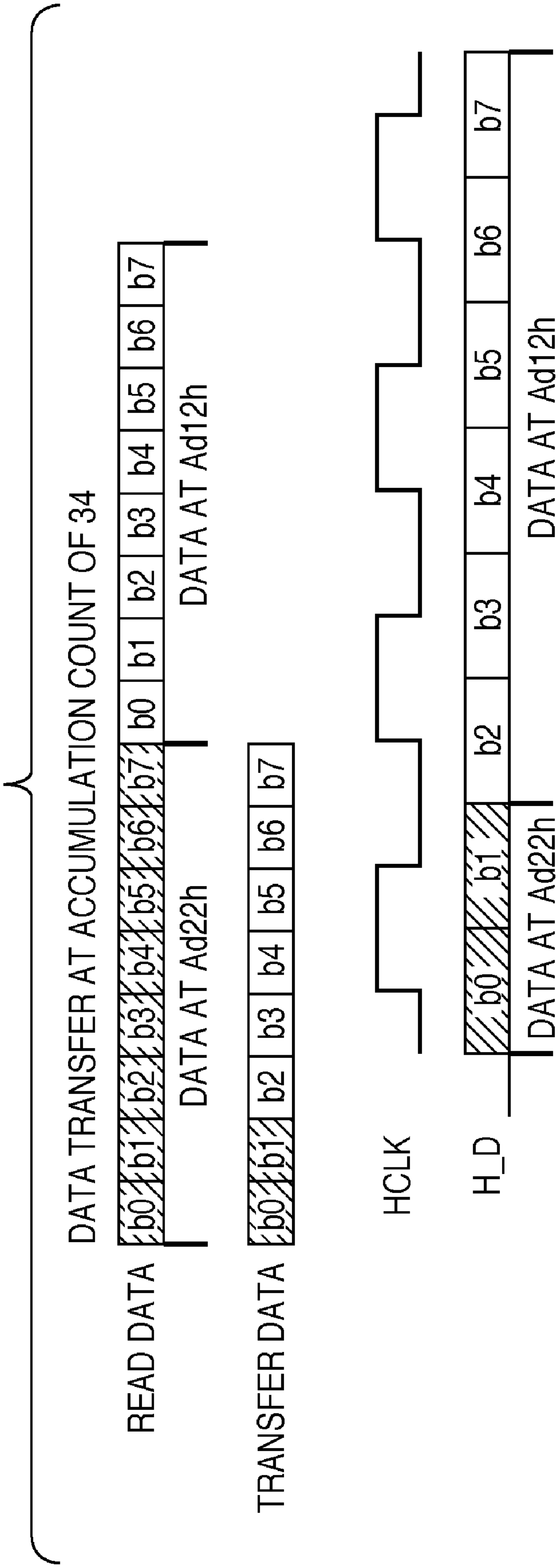
FIG. 29 is a schematic view of generation of data at the timing of an accumulation count of 34 in the first embodiment.

FIG. 29 is a schematic view of generation of transfer data at the timing of an accumulation count of 34.

Printing data of block 2 are read out from addresses 22 and 12 in the transfer buffer 213 to transfer the printing data. The correction values of groups 0 to 7 are compared with the count value "2" of the block counter 216A. As a result, printing data at address 21 are selected as printing data b0 and b1 of groups 0 and 1 which satisfy the condition of the correction value≦count value. Printing data at address 11 are selected as printing data of groups 2 to 7 which do not satisfy this condition.

Figure 26:
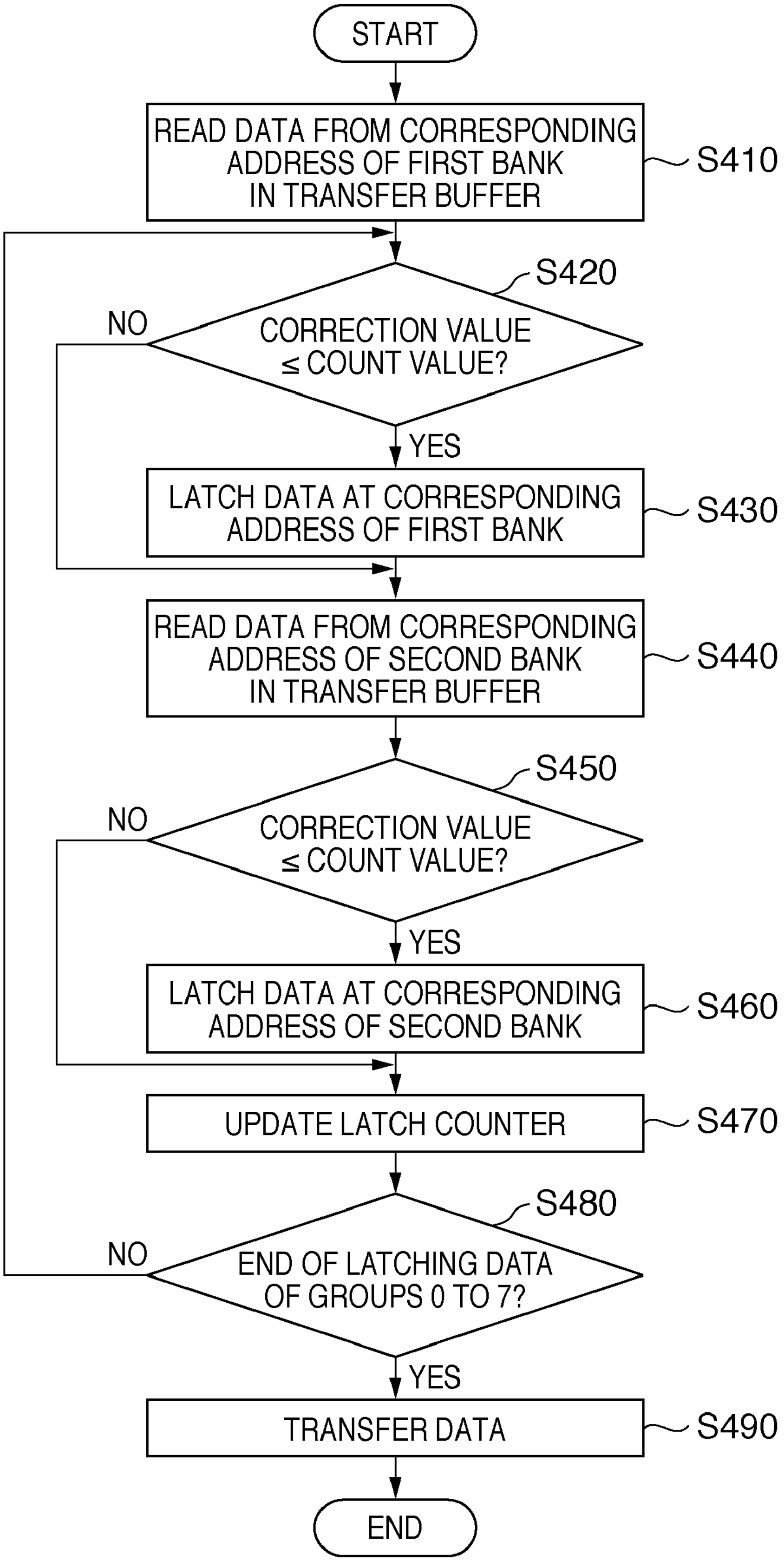
FIG. 26 is a flowchart of selection of printing data.

According to the printing data selection flowchart of FIG. 25, printing data are read out from the two banks of the transfer buffer 213, and latched by the first and second latch means. By selecting these printing data, transfer data are generated and latched by the third latch means. As another means, control may also be performed using only one latch means. FIG. 26 is a flowchart showing a case where control is performed using only one latch means.

After the printing timing signal is input, printing data is read out from address 16 of bank 1 serving as the first bank in the transfer buffer 213 (S410). The correction value of group 0 is compared with the count value of the block counter 216A (step S420). The condition of the correction value≦count value is satisfied as a result of comparing the correction value "0" of group 0 with the count value "6" of the block counter 216A. Hence, data b0 at address 16 is latched by the latch means (step S430).

Then, printing data is read out from address 16 of bank 0 serving as the second bank in the transfer buffer 213 (S440). In steps S450 and S460, printing data of groups which do not satisfy the condition in step S420 are latched. That is, only printing data of groups which satisfy the condition of the correction value>count value are latched.

In step S470, the latch counter is updated, and steps S420 to S470 are sequentially executed for groups 0 to 7 (step S480). As a result, transfer data b0 to b7 are generated. In step S490, the generated transfer data are transferred to the printhead 11, and the process ends.

At the timing of an accumulation count of 22, only printing data b0 to b3 at address 13 are latched in step S430, and printing data b4 to b7 at address 3 are latched in step S460.

In the embodiment, printing data of two banks are read out from the transfer buffer 213. For the first column, printing data of bank 0, and printing data of bank 2 that is printing data of one preceding column are read out. However, the first column is the start column, and bank 2 does not hold printing data of one preceding column. Hence, printing data is merely read for nothing from bank 2 and is not used in the printing operation of the first column. Similarly, for the fourth column, printing data of bank 0, and printing data of bank 2 that is printing data of one preceding column are read out. However, the fourth column is the final column, and bank 0 does not hold printing data to be printed in the fourth column. Thus, printing data is merely read for nothing from bank 0 and is not used in the printing operation of the fourth column.

The present invention may employ a configuration in which printing data of two banks are always read out and printing data of one bank is merely read for nothing for the first and final columns, as described in the embodiment. The same effects can also be obtained by a configuration in which only printing data of one bank is read out for the first and final columns such that only printing data of bank 0 is read out for the first column and only printing data of bank 2 is read out for the fourth column.

Figure 2:
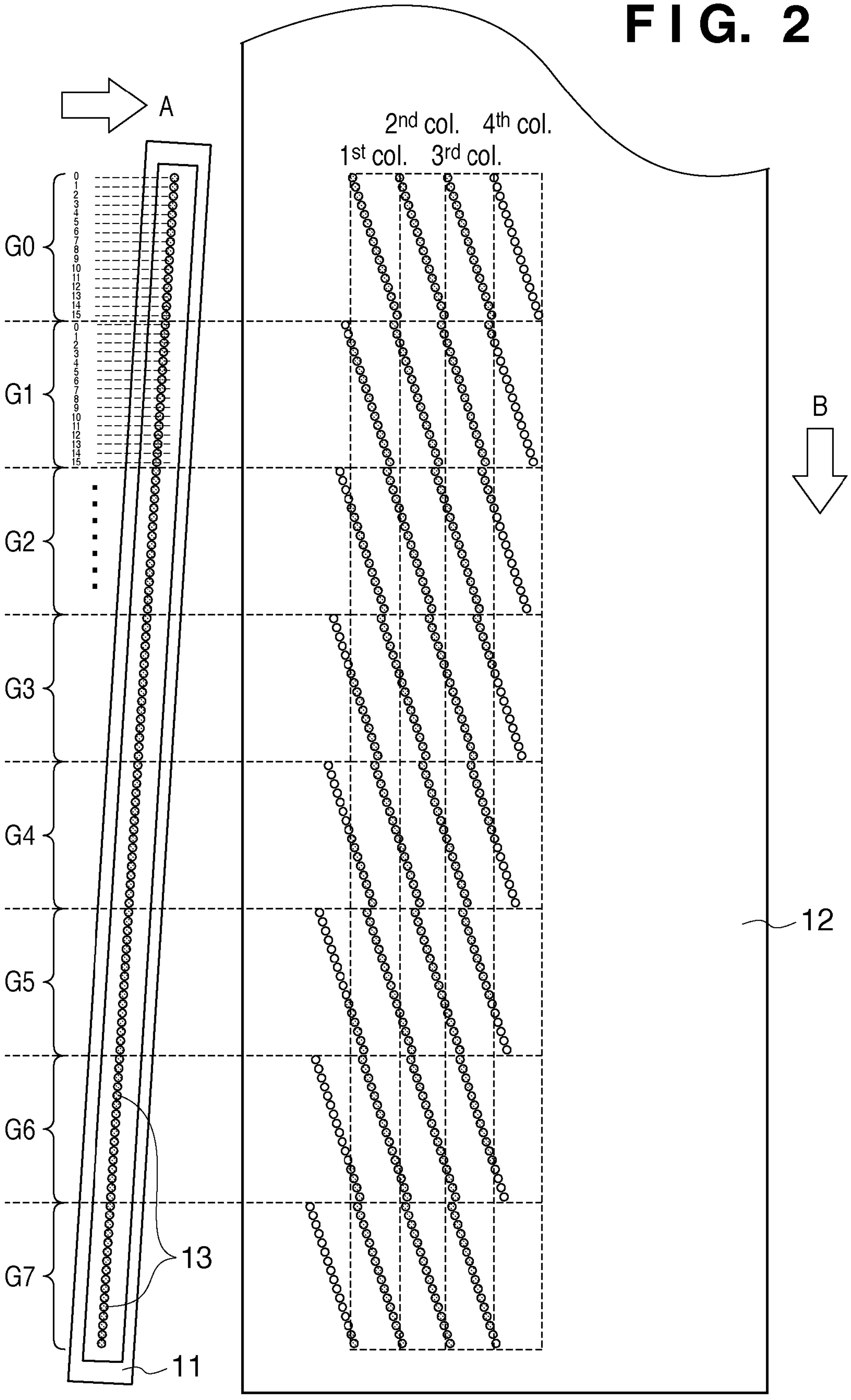
FIG. 2 is a view of the arrangement of formed dots in the first embodiment.

FIG. 2 shows the arrangement of dots formed on a printing medium by slanting displacement correction of the embodiment. Blank dots in FIG. 2 are formed when no slanting displacement correction of the embodiment is executed.

When slanting displacement occurs, dots are formed at positions deviated from the column area where the dots should be originally arranged. The number of such dots differs between groups. In slanting displacement described in the embodiment, the number of dots formed at deviated positions increases from 0 for group 0 serving as a reference to 2 for group 1, 4 for group 2, and 6 for group 3.

The slanting displacement correction of the embodiment changes printing data assigned to a printing element for a dot formed at a position deviated from the column area where the dot should be originally arranged. More specifically, when generating printing data assigned to the printing element, the printing data is selectable from two printing data, i.e., printing data of the current column and printing data of one preceding column.

As described above, when a group includes dots arranged in the column area where they should be originally arranged and dots arranged at positions deviated from the area, only the dots arranged at positions deviated from the area are offset in the main scanning direction. In this way, dots can be corrected to fall within the same column area.

Slanting displacement correction of the embodiment can, therefore, suppress degradation of the image quality.

Second Embodiment

[Slanting Displacement Correction in Distributed Driving]

According to an inkjet printing method, energy is applied to ink using a heater or piezoelectric element as a printing element, and ink droplets are discharged to print an image. This inkjet printing method suffers a phenomenon called cross-talk in which, when discharging an ink droplet from an ink orifice, the pressure wave or the like is applied to an adjacent ink orifice, making discharge from the adjacent ink orifice unstable. It is, therefore, desirable to perform distributed driving of printing elements in a driving sequence in which ink droplets are not successively discharged from adjacent ink orifices. Slanting displacement correction is applicable to even a configuration which performs distributed driving. This slanting displacement correction will be described similarly to the first embodiment.

Note that a description of the same contents as those of the first embodiment will be omitted.

Figure 20:
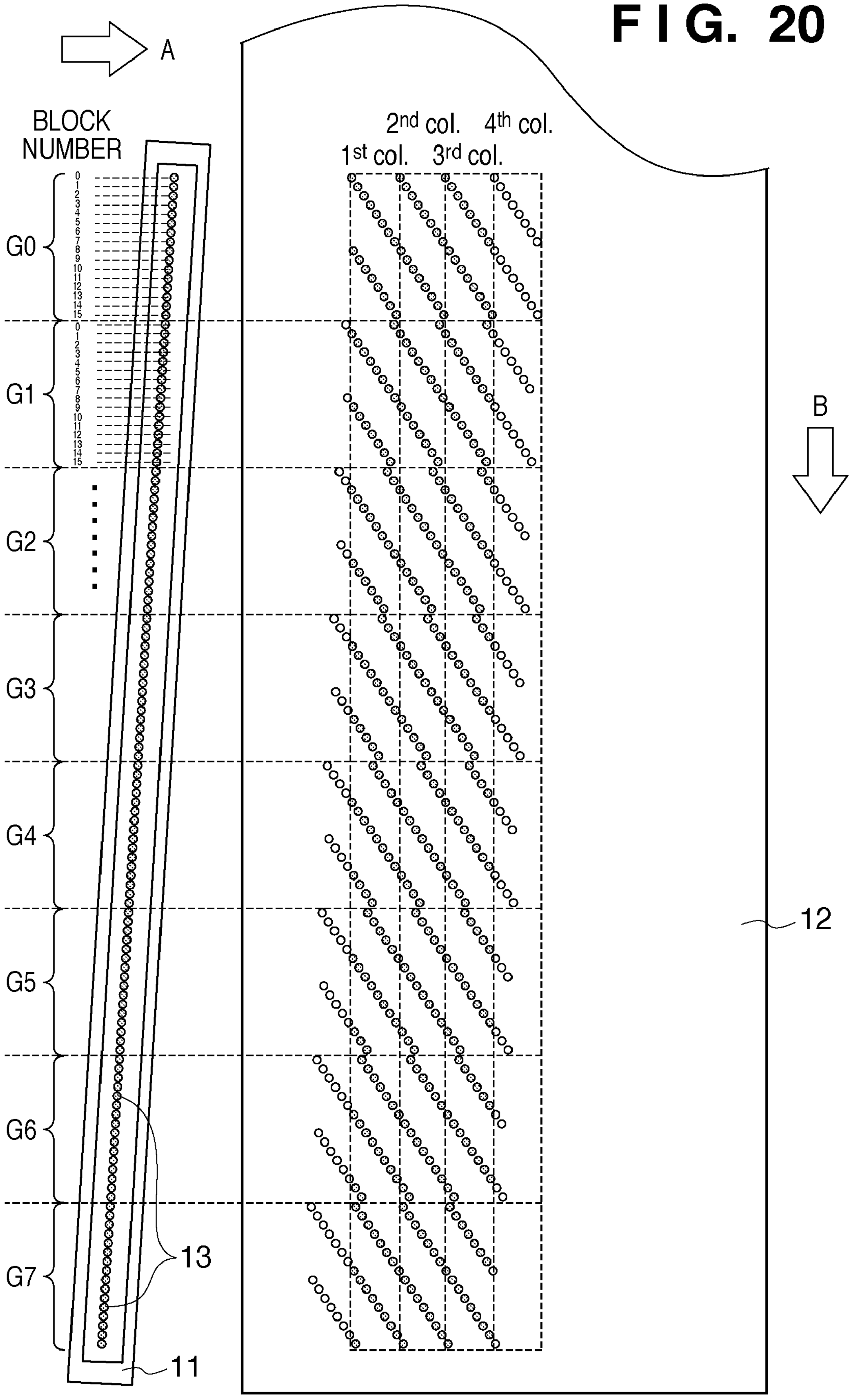
FIG. 20 is a view of the arrangement of formed dots in the second embodiment.

FIGS. 19 and 20 are views for explaining slanting displacement correction when printing in the driving sequence of printing elements in which ink droplets are not successively discharged from two adjacent ink orifices. In the second embodiment, printing elements are driven in the driving sequence of block 0→11→6→1→12→7→2→13→8→3→14→9→4→15→10→5.

Similar to FIG. 1, FIG. 19 is a view showing nozzle numbers NZL, selection blocks SBK, printing data DATA, and dot arrangement assigned to printing elements of respective groups. FIG. 20 shows the arrangement of dots formed on a printing medium when performing slanting displacement correction as shown in FIG. 19.

FIG. 30 is a view showing the timing to read out printing data from a transfer buffer 213.

An area shaded in light gray represents printing data printed in the first column, an unshaded area represents printing data printed in the second column, and an area shaded in thick gray represents printing data printed in the third column. The correction value of each group is 0 for group 0, 1 for group 1, 2 for group 2, 3 for group 3, 4 for group 4, 5 for group 5, 6 for group 6, and 7 for group 7.

A means for generating corrected printing data will be described.

A data selection circuit 215 reads out printing data of banks 0 and 2 from the transfer buffer 213 at the timings of accumulation counts of 0 to 15. The data selection circuit 215 reads out printing data of banks 1 and 0 at the timings of accumulation counts of 16 to 31. The data selection circuit 215 reads out printing data of banks 2 and 1 at the timings of accumulation counts of 32 to 47. The data selection circuit 215 reads out printing data of banks 1 and 0 at the timings of accumulation counts of 48 to 63. For example, at the timing of an accumulation count of 0, the data selection circuit 215 reads out printing data at addresses 0 and 20 as printing data of block 0. At the timing of an accumulation count of 22, the data selection circuit 215 reads out printing data at addresses 12 and 2 as printing data of block 2.

Figure 31:
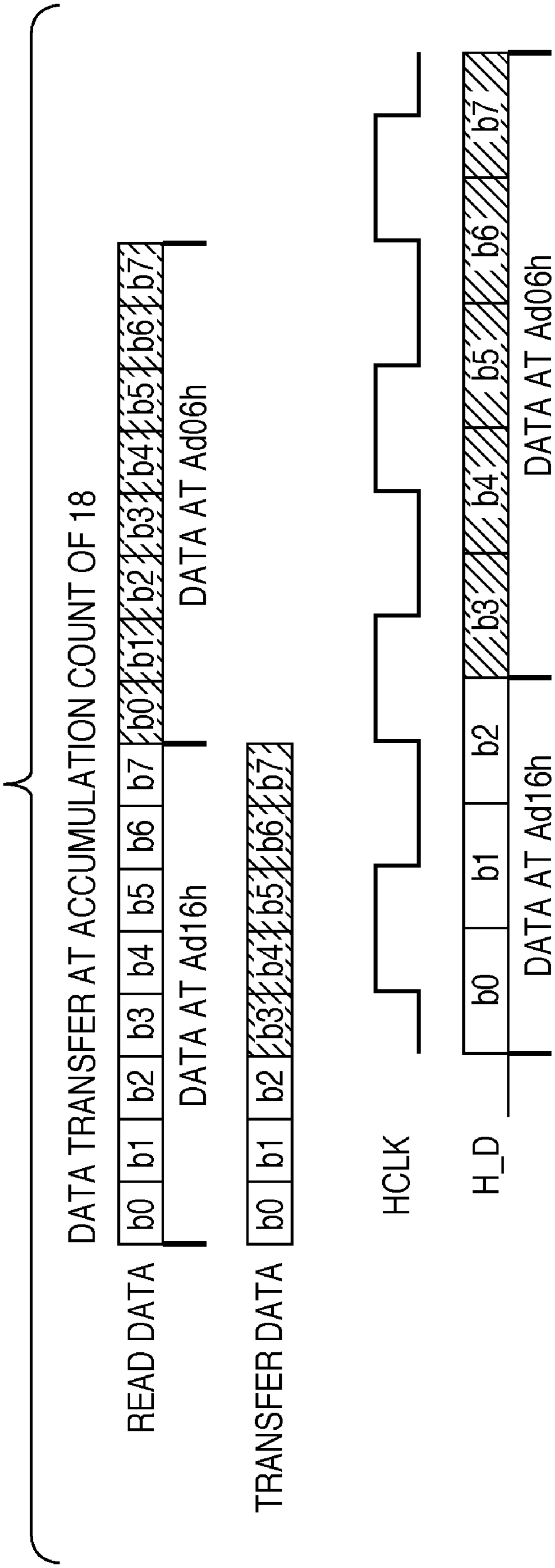
FIG. 31 is a schematic view of generation of data at the timing of an accumulation count of 18 in the second embodiment.

FIG. 31 is a schematic view of generation of transfer data at the timing of an accumulation count of 18.

As shown in FIG. 31, transfer data b0 to b2 for groups 0 to 2 are printing data of the second column that should be originally printed at an accumulation count of 18. Transfer data b4 to b7 for groups 3 to 7 are printing data of the first column that should be originally printed at timings before 16 timings. The generated transfer data are transmitted to a printhead 11 by a printing data transfer circuit 219 together with an HCLK signal generated by a data transfer CLK generator 218.

Figure 32:
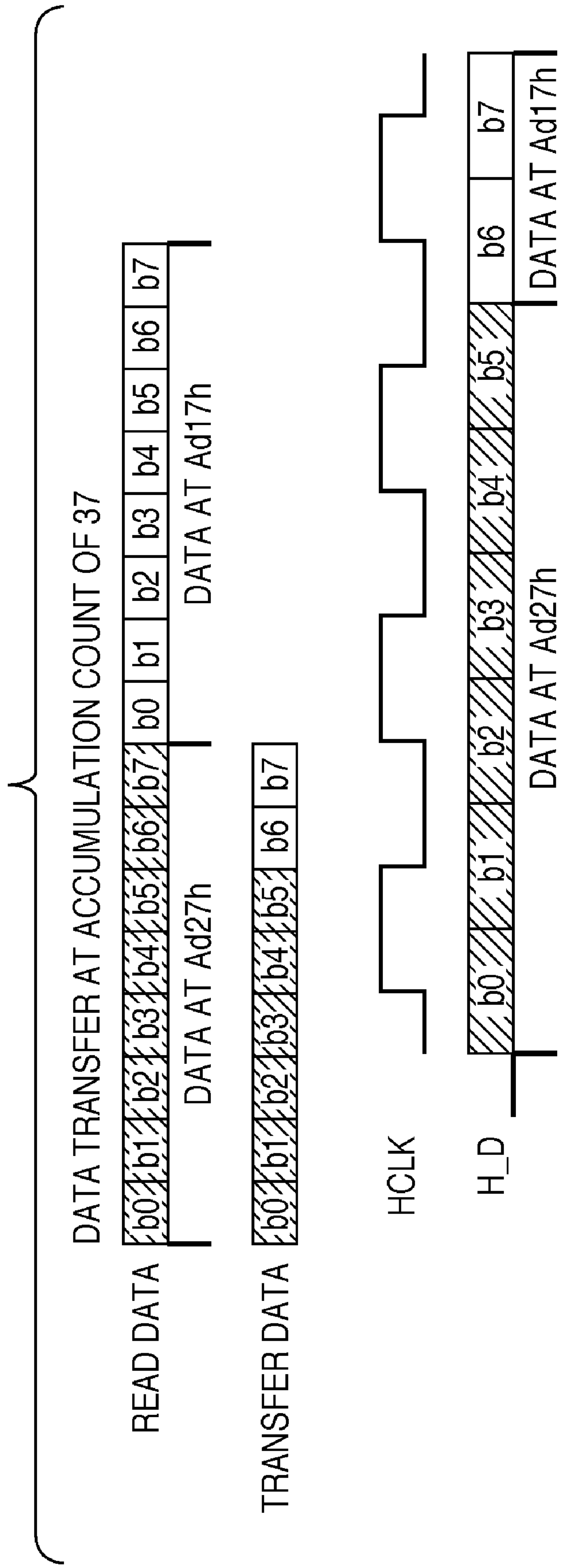
FIG. 32 is a schematic view of generation of data at the timing of an accumulation count of 37 in the second embodiment.
Figure 33:
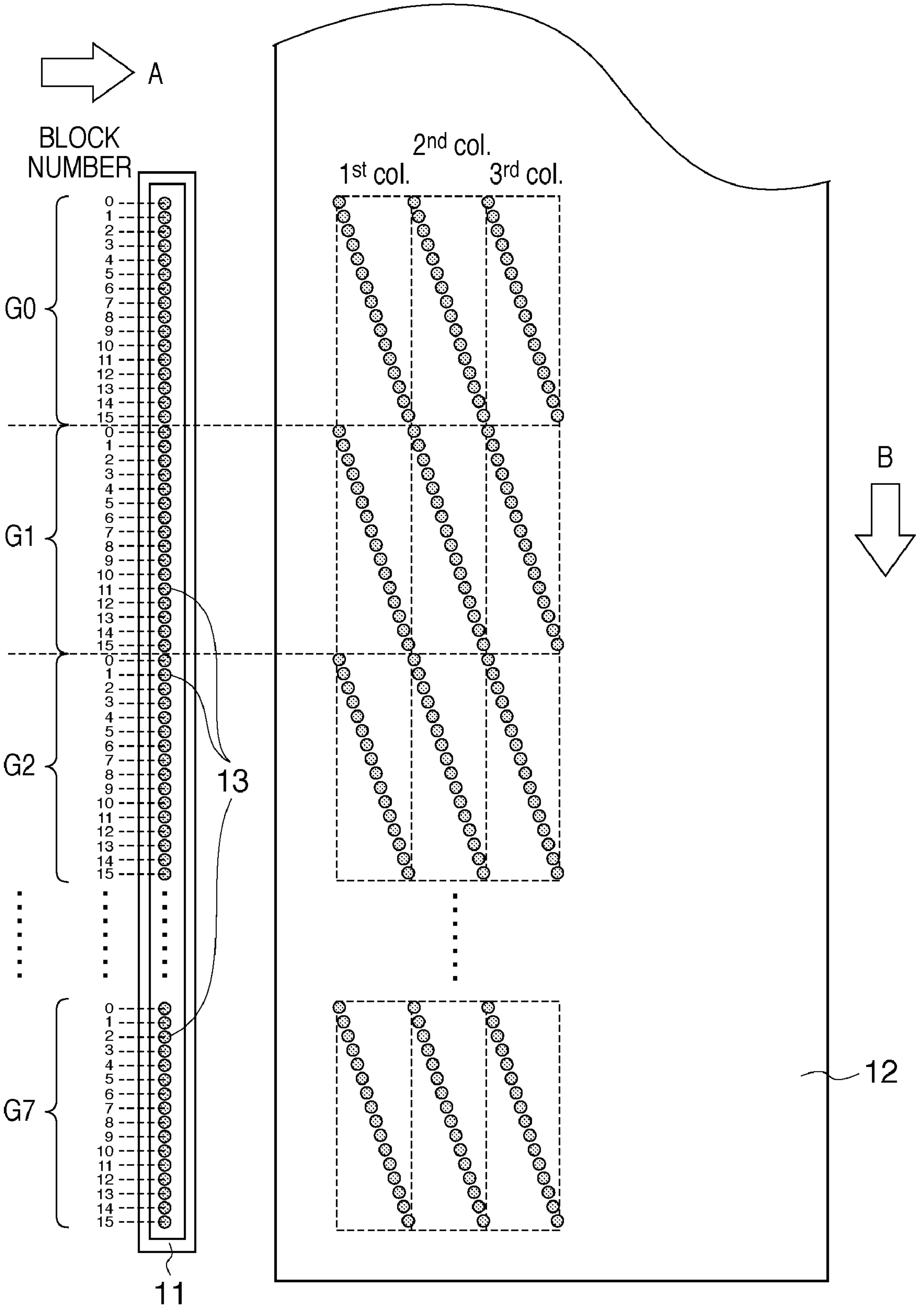
FIG. 33 is a view of an ideal dot arrangement on a printing medium.

FIG. 32 is a schematic view of generation of transfer data at the timing of an accumulation count of 37.

Printing data are read out from addresses 27 and 17 in the transfer buffer 213 to transfer printing data of block 7. The correction values of groups 0 to 7 are compared with the count value "5" of a block counter 216A. As a result, printing data at address 27 are selected as printing data b0 to b5 of groups 0 to 5 which satisfy the condition of the correction value≦transfer count. Printing data at address 17 are selected as printing data of groups 6 and 7 which do not satisfy this condition.

When distributed driving is performed, like the second embodiment, the driving sequence differs from that in the first embodiment. However, the second embodiment does not differ from the first embodiment in that the second embodiment latches printing data of one preceding column as printing data for a printing element whose discharge turn is early in each group until the data transfer count coincides with a number designated by correction information.

The second embodiment can execute the slanting displacement correction regardless of the driving sequence of printing elements.

Other Embodiments

Processes of data to be transferred to the printhead have been described, but these processes are not limited to the above-described contents.

For example, the format of data stored in the printing buffer 204 is not limited to the raster format, and may also be the column format. In this case, data stored in the printing buffer 204 is stored in the transfer buffer 213 without utilizing the H-V converter 205 and nozzle buffer 211 as long as the data format is the column format and corresponds to the above-mentioned blocks of the printhead.

In the above-described embodiments, the transfer buffer has areas corresponding to three columns, and transfer data are generated from image data of two of these columns. However, the present invention is not limited to this configuration.

For example, the transfer buffer may have areas corresponding to four columns in accordance with the degree of the slant, the number of printing elements of the printing element array, the number of blocks, the number of printing elements per block, and the like. In this case, transfer data are generated from image data of three of these columns.

It is also possible to input slant information from the host 200 connected to the printing apparatus and store it in the correction amount storage 217.

An embodiment of the present invention provides a print method for a print apparatus comprising an array of printing elements for dispensing ink onto a print medium, which array of printing elements extends in a first direction, the print apparatus being configured to drive the printing elements on a block-by-block basis, each block comprising a group of printing elements that are localized in the first direction, method comprising: detecting an error in the positioning of the array of printing elements within the printing apparatus that causes a deviation of the first direction from a predetermined direction, and adjusting, based on the detected deviation, print timings of the printing elements in the blocks being dependent on the block to which each printing element belongs, which adjustments for the blocks are determined relative to a reference block, the adjustment for each block being substantially proportional to the distance of the block from the reference block in the first direction.

An embodiment of the present invention provides a print apparatus comprising an array of printing elements for dispensing ink onto a print medium, which array of printing elements extends in a first direction, the print apparatus being configured to drive the printing elements on a block-by-block basis, each block comprising a group of printing elements that are localized in the first direction, the print apparatus comprising: a detector for detecting an error in the positioning of the array of printing elements within the printing apparatus that causes a deviation of the first direction from a predetermined direction, and compensation means operable, based on the detected deviation, to adjust print timings of the printing elements in the blocks dependent on the block to which each printing element belongs, which adjustments for the blocks are determined relative to a reference block, the adjustment for each block being substantially proportional to the distance of the block from the reference block in the first direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-173113, filed Jun. 29, 2007, which is hereby incorporated by reference herein in its entirety.

What is claimed is:

1. A printing apparatus which prints by dividing a plurality of printing elements into a plurality of blocks and time-divisionally driving the plurality of printing elements while a printhead having a printing element array in which the plurality of printing elements are arrayed scans based on image data in a direction intersecting an arrayed direction of the plurality of printing elements, the apparatus comprising:

obtaining means for obtaining slant information of the printing element array in a scanning direction of the printhead;

a printing buffer which stores the image data used to print by one scanning of the printhead;

a transfer buffer which stores, for each column, image data of a plurality of columns used by the printing element array out of image data that are stored in said printing buffer and used to print by the plurality of printing elements;

read control means for reading out, from said transfer buffer, for each block, image data of at least two successive columns of the printing element array out of the image data of a plurality of columns;

selection means for selecting image data of a column read out by said read control means for each printing element of a block, based on the slant information;

write control means for newly reading out image data of one column of the printing element array from said printing buffer, and rewriting in an area of said transfer buffer corresponding to one column of the printing element array where read-out by said read control means is completed; and transfer means for transferring the image data selected by said selection means to the printhead.

2. The apparatus according to claim 1, further comprising a nozzle buffer which stores image data obtained by H-V-converting image data stored in said printing buffer, wherein said write control means rewrites by reading out the image data stored in said nozzle buffer.

3. The apparatus according to claim 1, wherein said selection means has two latch means for respectively latching the image data of two successive columns of the printing element array out of the image data of three columns, and said selection means selects either of the image data latched by said two latch means.

4. The apparatus according to claim 1, wherein said selection means has one latch means for sequentially latching the image data of two successive columns of the printing element array out of the image data of three columns, and when said selection means does not select image data latched first, said selection means selects image data latched later.

5. The apparatus according to claim 1, wherein said obtaining means includes an optical sensor, and obtains the slant information from images formed by printing elements at two ends of the printing element array.

6. The apparatus according to claim 1, wherein the printhead includes an inkjet printhead.

7. A method of controlling a printing apparatus which prints by dividing a plurality of printing elements into a plurality of blocks and time-divisionally driving the plurality of printing elements while a printhead having a printing element array in which the plurality of printing elements are arrayed scans based on image data in a direction intersecting an arrayed direction of the plurality of printing elements, the method comprising:

an obtaining step of obtaining slant information of the printing element array in a scanning direction of the printhead;

a step of storing, in a printing buffer, the image data used to print by one scanning of the printhead;

a step of storing, in a transfer buffer for each column, image data of a plurality of columns used by the printing element array out of image data stored in the printing buffer;

a read control step of reading out, from the transfer buffer for each block, image data of at least two successive columns of the printing element array out of the image data of a plurality of columns;

a selection step of selecting image data of a column read out in the read control step for each printing element of a block, based on the slant information;

a write control step of newly reading out image data of one column of the printing element array from the printing buffer, and rewriting in an area of the transfer buffer corresponding to one column of the printing element array where read-out in the read control step is completed;

a transfer step of transferring the image data selected in the selection step to the printhead; and a printing step of printing, based on the image data transferred in the transfer step.

* * * * *